(12) United States Patent
Tatewaki et al.

(10) Patent No.: US 6,402,354 B1
(45) Date of Patent: Jun. 11, 2002

(54) INDIRECT LIGHTING SYSTEM FOR VEHICLE INTERIOR

(75) Inventors: Yasumasa Tatewaki; Tadanobu Iwasa, both of Ichinomiya; Osamu Yamanaka, Nishikasugai-gun; Hiroshi Sugihara, Ogaki; Akihiro Misawa, Ichinomiya; Tetsuo Tanabe, Ogaki; Takao Mukogawa, Bisai, all of (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 0 days.

(21) Appl. No.: 09/605,652

(22) Filed: Jun. 28, 2000

(30) Foreign Application Priority Data

Jun. 28, 1999 (JP) ............................................. 11-181512
Aug. 30, 1999 (JP) ............................................. 11-243912
Jan. 26, 2000 (JP) ........................................ 2000-017459

(51) Int. Cl.[7] ................................................. B60Q 1/00
(52) U.S. Cl. ........................ 362/490; 362/545; 362/549; 362/234; 362/479
(58) Field of Search ................................. 362/490, 543, 362/545, 549, 147, 234, 253, 31, 471, 479, 488, 511

(56) References Cited

U.S. PATENT DOCUMENTS 5,938,321 A * 8/1999 Bos et al. .................... 362/494

* cited by examiner

Primary Examiner—Sandra O'Shea
Assistant Examiner—Ronald E. DelGizzi
(74) Attorney, Agent, or Firm—Pillsbury Winthrop LLP

(57) ABSTRACT

A direct lighting unit fits in opposition to an opening of a roof of a vehicle's cabin so as to illuminate a light directly the cabin. An indirect lighting unit is disposed around the outer circumference of the direct lighting unit. The indirect lighting unit contains a plurality of LEDs disposed at fixed intervals so as to emit light outward. The LEDs are controlled to indirectly illuminate the roof. When the direct lighting unit is mounted to the roof, a fixing piece supports a grooved edge portion of the indirect lighting unit so that the indirect lighting unit is immovably held between the fixing piece and the roof. Thus, the direct and indirect lighting units are simultaneously secured to the roof.

10 Claims, 21 Drawing Sheets

INDIRECT LIGHTING SYSTEM FOR VEHICLE INTERIOR

BACKGROUND OF THE INVENTION

1. Field of the Invention

This invention relates to a vehicle room lamp that illuminates the interior of a vehicle such as an automobile, more particularly, to a room lamp that provides illumination of a desired light color in addition to a normal room lamp.

2. Description of the Related Art

Generally, a conventional room lamp is mounted on the center of the roof inside a vehicle. The room lamp has a bulb as a light source housed therein. The bulb is lit to illuminate the cabin. On the other hand, a fluorescent lamp is used as a room lamp in some automobiles such as a mini van or a sport utility vehicle, e.g. in order to give a luxurious feeling to the interior of the vehicle.

In recent years, users have acquired a wide variety of preferences, and their sense of value also has become very diversified. Accordingly, the equipment provided within a car's interior should provide its users with as many design choices as possible from a variety of viewpoints and decorating styles. However, the conventional room lamp is commonly required to give a sufficient illumination to the cabin only in the nighttime or the like. Namely, it is used from a functional viewpoint, and its main purpose is to light up the interior of the cabin. Therefore, its light color is limited to one color, e.g. white, which is the color of the installed bulb or fluorescent lamp. Moreover, the lamp is operated in only three modes, i.e. an on mode, an off mode and a door link mode in which it is switched on and off in accordance with the opening and closing of a door. In short, the conventional vehicle room lamp is limited in its variety of design and decoration style. Thus, it can be improved from an ornamental viewpoint. Furthermore, in order to prevent the interior light from disturbing the driver while driving, the conventional vehicle room lamp is switched off and never operated during operation of the vehicle. In addition, some colors, for example, red, may be prohibited by the traffic laws of certain countries, so that the design is limited from this aspect, as well.

BRIEF SUMMARY OF THE INVENTION

An object of the present invention is to provide a vehicle room lamp that can give a wide variety of illumination modes, as well as many design choices.

According to a first embodiment of the invention, a vehicle room lamp comprises a plurality of light emitting diodes (LEDs) disposed on the roof of a vehicle's cabin at fixed intervals. Control means controls the light emission of the LEDs to illuminate the cabin.

According to a second embodiment of the invention, a vehicle room lamp comprises a direct lighting unit attached to the roof of the vehicle's cabin so as to illuminate the light directly into the cabin. An indirect lighting unit has a plurality of LEDs disposed on the roof at fixed intervals and controls the light emission of the LEDs so that the LEDs illuminate the roof, thereby indirectly illuminating the cabin.

According to a third embodiment of the invention, a vehicle room lamp comprises a housing attached to a roof of the vehicle's cabin and surrounding the outer circumference of a room lamp unit for illuminating the cabin. The housing contains a plurality of LEDs. The LEDs are capable of emitting three primary colors of light. A light guide projects the light of the LEDs within the cabin so as to define a planar light source. A control circuit controls the light emission of the LEDs. A switch initiates the control operation of the control circuit.

According to a fourth embodiment of the invention, a vehicle room lamp comprises a housing attached to the roof of a vehicle's cabin. An LED is disposed in the housing so as to emit a light toward the cabin. A lens is disposed on the housing so as to face the light emission side of the LED. The lens vertically converges at least at a lower portion of the diffused light of the LED that travels to the roof with a downward inclination, thereby transforming at least the lower portion of the diffused light into a light composed of rays substantially parallel to the roof. The parallel rays are directed to radiate to the cabin.

Further objects and advantages of the invention will be apparent from the following description, reference being had to the accompanying drawings, wherein preferred embodiments of the invention are clearly shown.

BRIEF DESCRIPTION OF THE SEVERAL VIEWS OF THE DRAWINGS

The invention will be described with respect to the accompanying drawings, in which like elements are referenced with like numbers and in which.

DETAILED DESCRIPTION OF THE INVENTION

Figure 1:
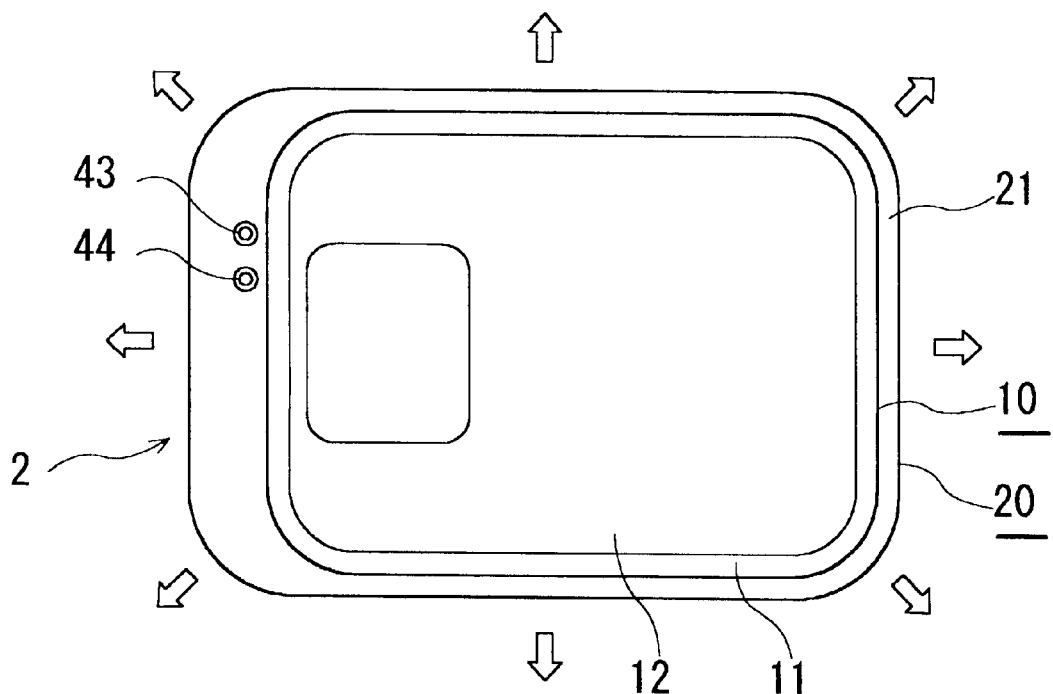
FIG. 1 is a plain view of a first embodiment of vehicle room lamp of the invention.

Several embodiments of the invention are described hereunder referring to the attached drawings. The same reference character is used to show the same element throughout the several embodiments.

Figure 2:
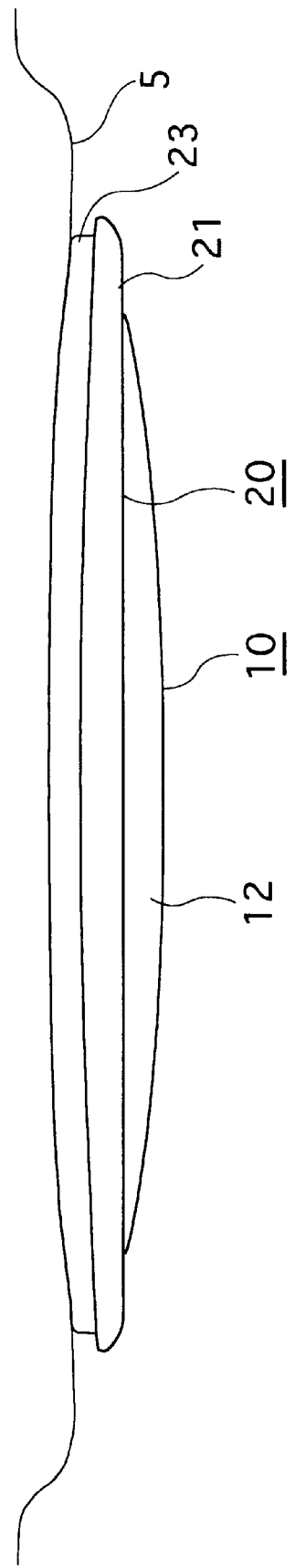
FIG. 2 is a side view of the first embodiment of the room lamp of the invention mounted on the roof of a vehicle.
Figure 3:
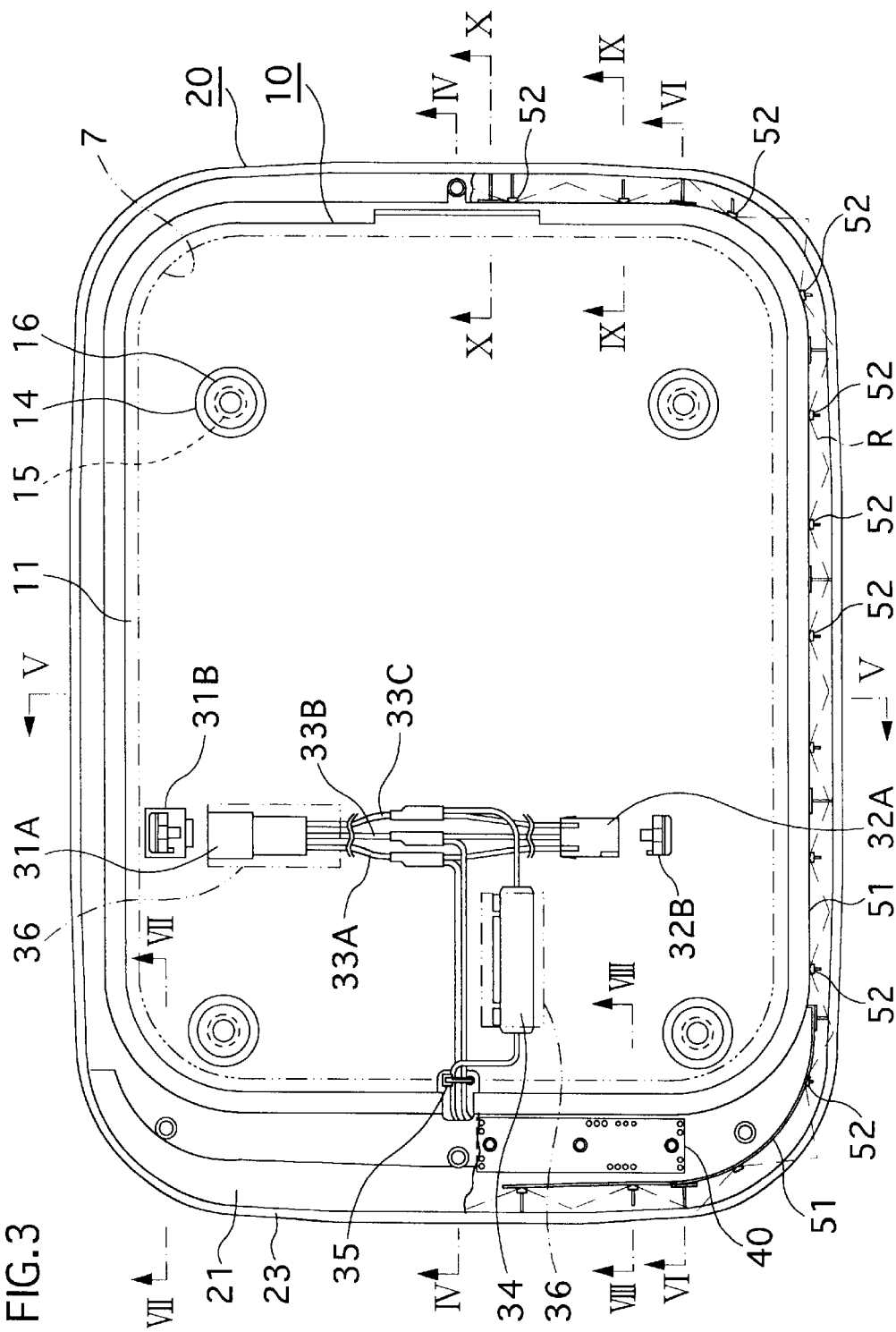
FIG. 3 is a rear side view of the first embodiment of the room lamp of the invention.
Figure 4:
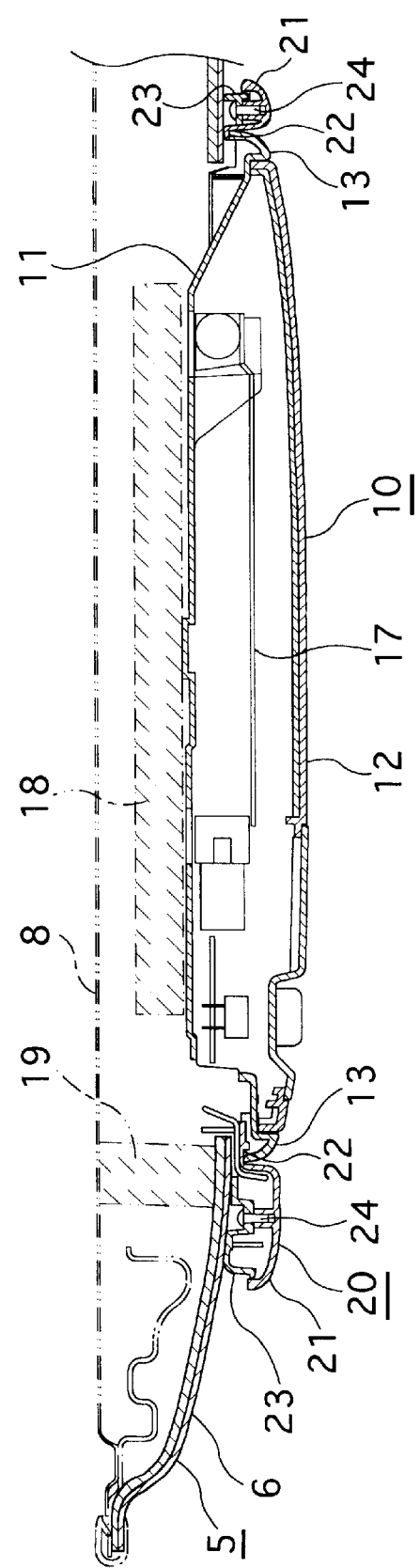
FIG. 4 is a cross-sectional view taken along the line IV—IV of FIG. 3.
Figure 5:
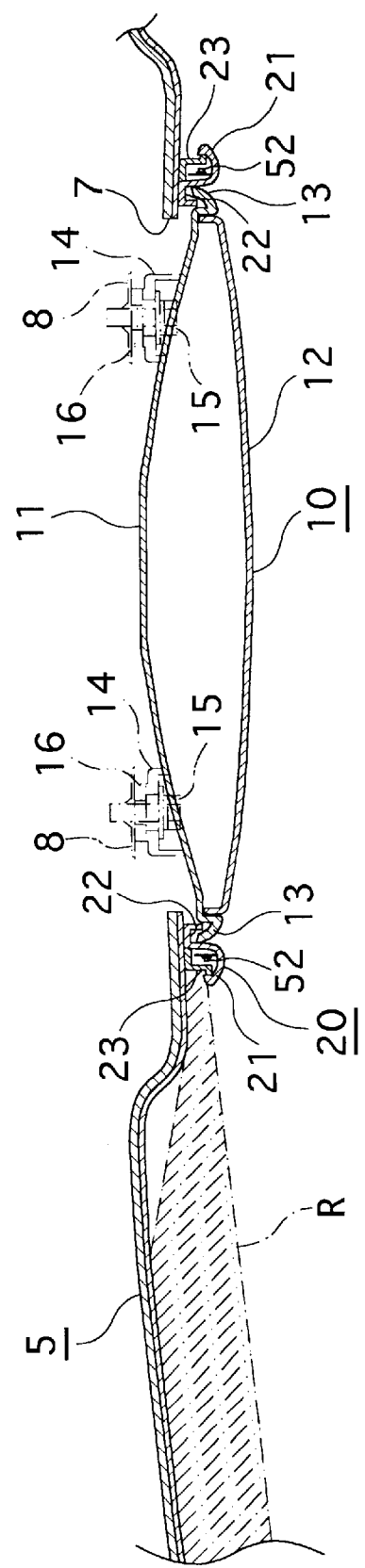
FIG. 5 is a cross-sectional view taken along the line V—V of FIG. 3.

FIG. 1 illustrates a front side of a first embodiment of vehicle room lamp of the invention. FIG. 2 illustrates a lateral side of the first embodiment of a room lamp that is mounted on a roof of a vehicle. FIG. 3 illustrates a rear side of the first embodiment of room lamp. FIG. 4 illustrates a cross-section taken along the line IV—IV of FIG. 3. FIG. 5 illustrates a cross-section taken along the line V—V of FIG. 3.

Referring to FIGS. 1 and 2, the vehicle room lamp 2 according to the first embodiment has a direct lighting unit 10 and an indirect lighting unit 20. Inside a vehicle's cabin, the vehicle room lamp 2 is disposed at a predetermined position on a molded roof 5 of a vehicle. As shown, in detail, in FIGS. 3 to 5, the direct lighting unit 10 is attached to a side of a roof lining 6 of the roof lining 5 inside the cabin so as to oppose to an opening 7 that is formed near the center of the roof 5. The direct lighting unit 10 includes a housing base 11 and a light transmitting or translucent cover 12. The housing base 11 is made of a sheet of material such as synthetic resin sheet and is configured into substantially a tray shape having dimensions corresponding to the opening 7 of the roof 5. The housing base 11 has an opening at one end (lower end in FIG. 4). The translucent cover 12 is made of a sheet of material such as a synthetic resin sheet and is configured into substantially a lid shape covering the lower end opening of the housing base 11. The cover 12 is detachably fitted to the opening of the housing base 11. The cover 12 may be made of any material as long as it permits light to pass from a light source. Namely, it may be transparent, semi-transparent or colored transparent. The housing base 11 and cover 12 constitute a housing of a box shape.

Figure 6:
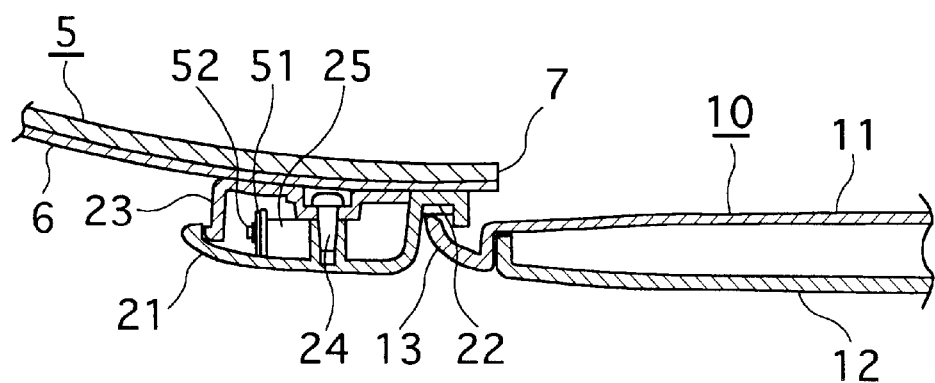
FIG. 6 is a cross-sectional view taken along the line VI—VI of FIG. 3.
Figure 7:
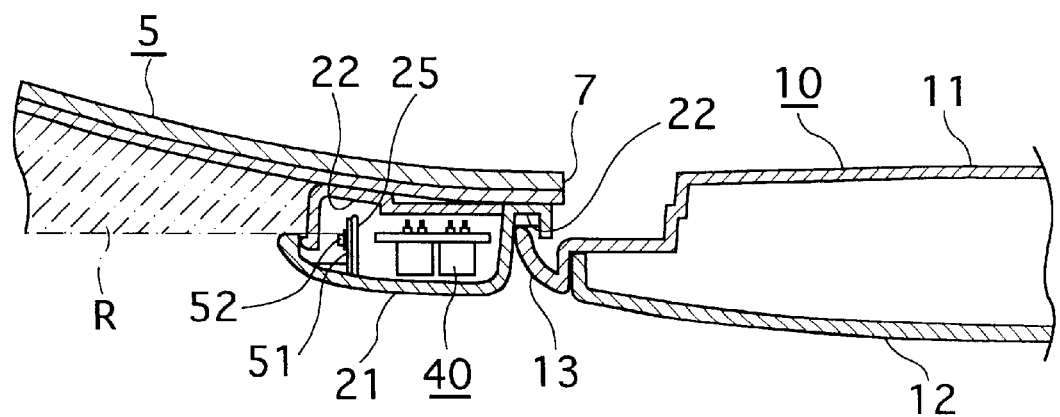
FIG. 7 is a cross-sectional view taken along the line VII—VII of FIG. 3.

FIG. 6 illustrates a cross-section taken along the line VI—VI of FIG. 3. FIG. 7 illustrates a cross-section taken along the line VII—VII of FIG. 3.

Referring to FIGS. 6 and 7, a fixing piece 13 is formed around an outer circumference of the housing base 11. The fixing piece 13 has a cross-section of a hook that is extended upward and that may have a snap-on structure. While the fixing piece 13 is formed around the entire circumference of the housing base 11 in the present embodiment, it may be found on only a portion of the circumference of the housing base 11.

Figure 8:
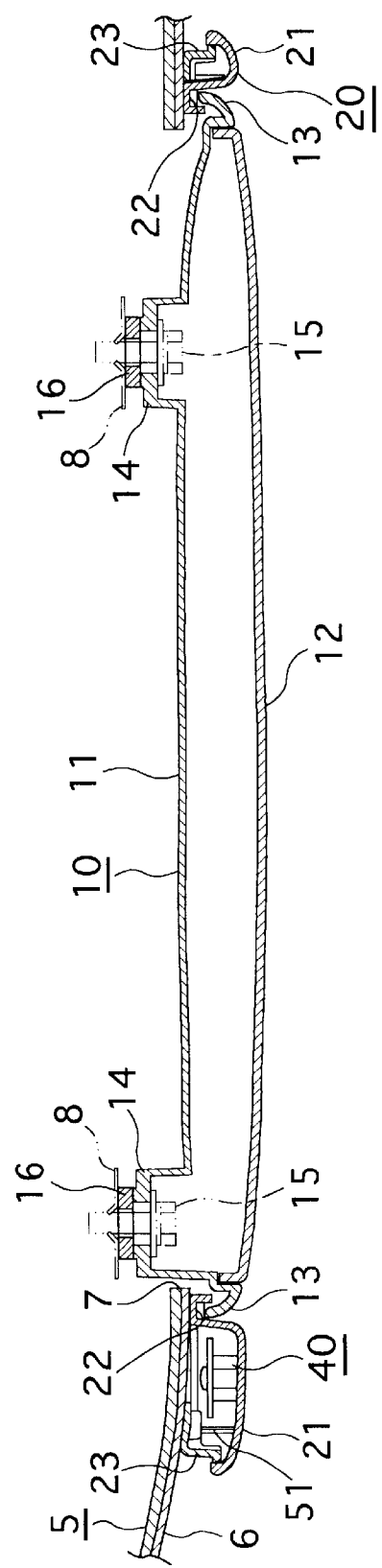
FIG. 8 is a cross-sectional view taken along the line VIII—VIII of FIG. 3.
Figure 9:
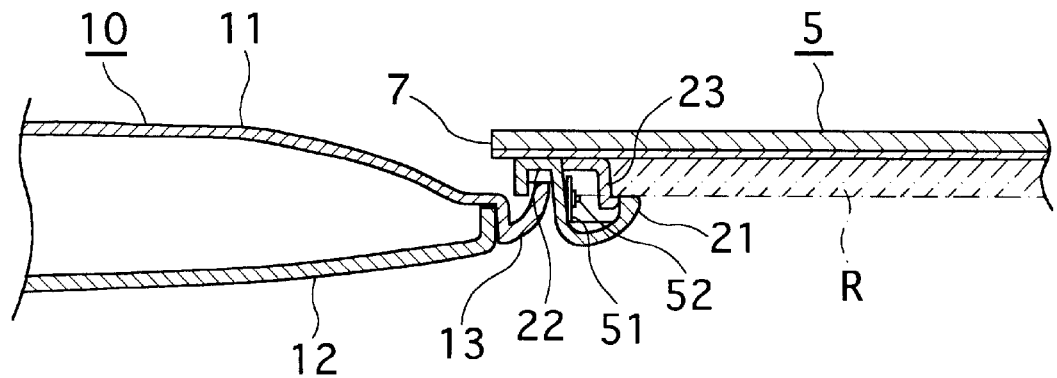
FIG. 9 is a cross-sectional view taken along the line IX—IX of FIG. 3.
Figure 10:
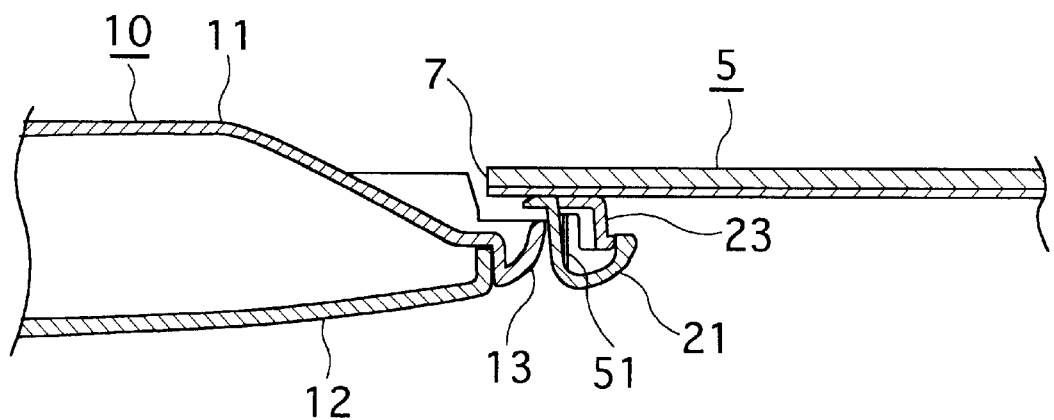
FIG. 10 is a cross-sectional view taken along the line X—X of FIG. 3.

FIG. 8 illustrates a cross-section taken along the line VIII—VIII of FIG. 3. FIG. 9 illustrates a cross-section taken along the line IX—IX of FIG. 3. FIG. 10 illustrates a cross-section taken along the line X—X of FIG. 3.

Referring to FIG. 8, a fitting unit is integrally provided on an upper surface side, opposed to the roof 5, of the housing base 11. The fitting unit consists of a fitting base 14, fastener 15 and spacer 16. The fitting base 14 is integrally formed on the upper surface of the housing base 11 so as to protrude upward in a hollow cylindrical shape. A threaded portion of a bolt serves as the fastener 15 and inserts into the fitting base 14 so as to extend in a axial direction of the fitting base 14 and protrude from an upper end of the fitting base 14. While the bolt is used as the fastener 15 in the present embodiment, another type of fastener may be used such as a clip. The spacer 16 has a disc shape corresponding to an upper end surface of the fitting base 14. The spacer 16 is fixed on the upper end surface of the fitting base 14 by a double adhesive coated tape or the like. The bolt 15 is inserted from a lower end of the fitting base 14 and screwed into a hole that is formed on a roofing sheet metal 8. Thus, the housing base 11 is secured to the roof 5 via the fitting units 14, 15, and 16.

A fluorescent lamp 17 as a direct light source is attached to a lower surface of the housing base 11. The present invention is not limited to the use of fluorescent lighting. Another kind of direct light source may be used instead of the fluorescent lamp 17. The housing base 11, cover 12 and fluorescent lamp 17 constitute a fluorescent room lamp (dome lamp). A cushion 18 is fixed on the upper surface of the housing base 11 so as to face the fluorescent lamp 17. A cushion 19 is secured between the roof 5 and the roofing sheet metal 8 at a position corresponding to the fixing piece 13. The cushions 18, 19 are made of a shock-absorbing material such as a polyurethane foam.

The indirect lighting unit 20 is interposed between the direct lighting unit 10 and the roof 5. The indirect lighting unit 20 has a cover 21 made of a polypropylene (PP) or the like. The cover 21 has substantially a ring shape corresponding to the outer circumference of the housing base 11. The cover 21 has an inner edge portion formed into a fitting groove 22. The fixing piece 13 of the housing base 11 is fitted into the groove 22. The dimensions of the fitting groove correspond to the fixing piece 13. Namely, if the fixing piece 18 is provided around the whole circumference of the housing base 11, the fixing groove 22 is also provided around the whole inner circumference of the cover 21. If the fixing piece 13 is formed on part of the circumference of the housing base 11, the fixing groove 22 is also formed on the part of the inner circumference of the cover 21 so as to be opposed to the fixing piece 13. In this instance, however, the fixing groove 22 may be provided around the whole inner circumference of the cover 21.

The indirect lighting unit 20 has a lens 23 made of a light transmitting or translucent material such as a polycarbonate (PC). The lens 23 has substantially a ring shape corresponding to the cover 21. The lens 23 is positioned on the upper surface of the cover 21 and fixed integrally to the cover 21 by screws 24. The cover 21 and lens 23 constitutes a housing of a toroidal box shape corresponding to the outline of the housing 11, 12.

In mounting the direct lighting unit 10 on the roof 5, the fixing piece 13 is fitted into the groove 22 to provide downward support for the cover 21 so that the cover 21 is immovably held between the fixing piece 13 and the roof 5. Then, the direct lighting unit 10 is secured to the roof 5 by the fitting units 14, 15, and 16 so that the indirect lighting unit 20 is also secured to the roof 5 integrally and simultaneously with the direct lighting unit 10. Moreover, the housing of cover 21 and lens 23 of the indirect lighting unit 20 is simultaneously attached onto the outer circumference of the housings 11, 12 of the direct lighting unit 10. A fastening base 25 is integrally provided on the inside or inner surface of the cover 21. A flexible printed board described later is mounted on the fastening base 25.

Figure 11:
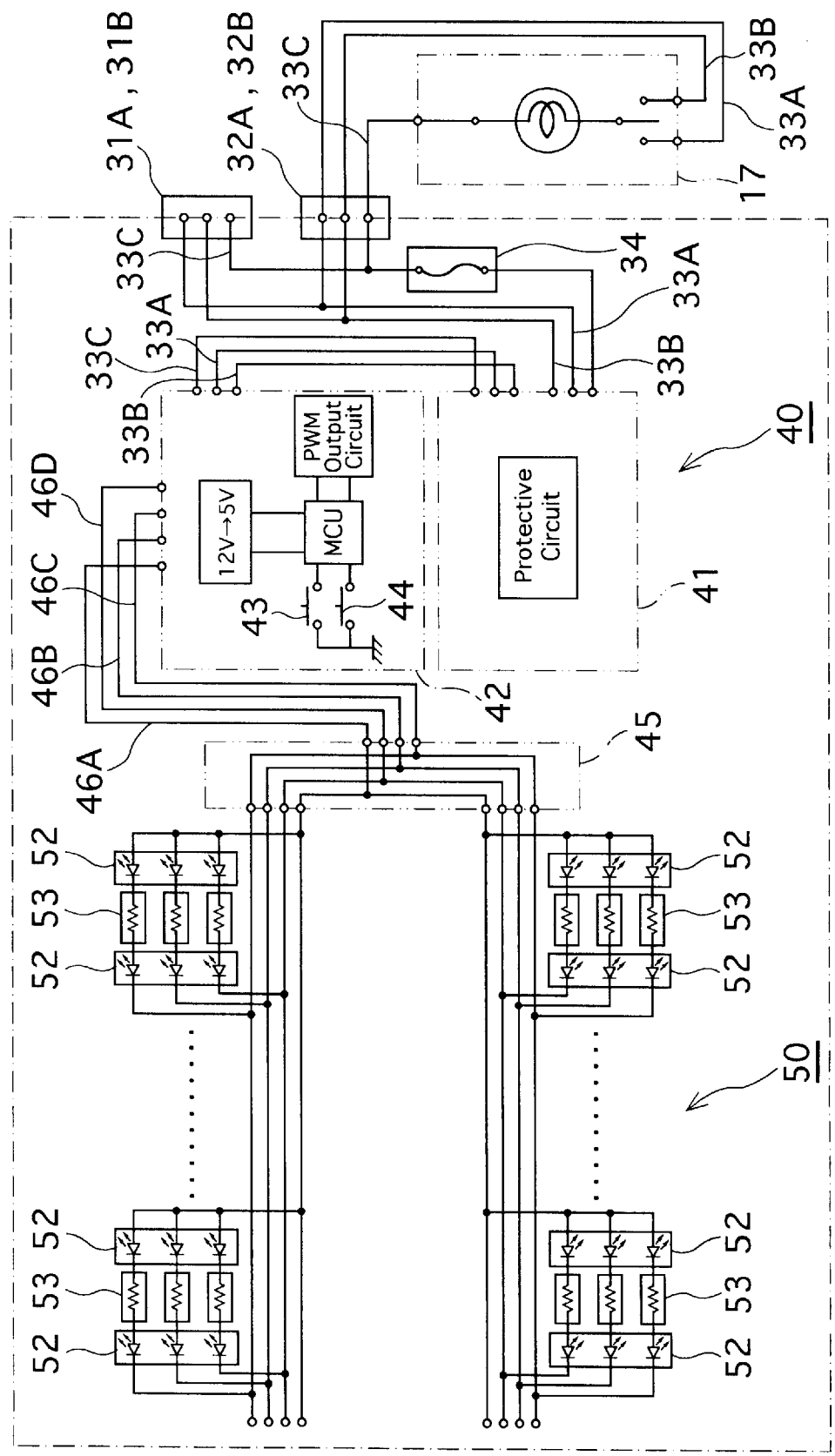
FIG. 11 is a diagram showing an electric circuit of the first embodiment of the room lamp of the invention.

An electric configuration of the room lamp according to the first embodiment is described hereafter. FIG. 11 illustrates an electric circuit of the first embodiment of room lamp.

Referring back to FIG. 3, the housing base 11 accommodates therein a connector 31A and a connector 32A. The connector 31A is connected to a vehicle wiring harness connector 31B. The connector 32A is connected to a dome lamp connector 32B. The connectors 31A and 32A are made up of a 3P connector and connected by cords 33A, 33B and 33C. The cord 33A serves to supply a ground signal. The cord 33B acts to supply a courtesy lamp signal. The cord 33C functions to supply an electric power from a battery.

Each of the cords 33A, 33B and 33C branches near the middle thereof. The three branch lines are connected to a control circuit 42 described later via a printed circuit board 40. The branch line of the power supplying cord 33C is connected to the printed circuit board 40 via a fuse 34 for shutting off an overcurrent. The branch lines of the cords 33A, 33B and 33C are bound by a binding band 35 and guided to the printed circuit board 40. A wiring part is constituted by the connectors 31A, 31B, 32A, 32B, cords 33A, 33B, 33C and fuse 34. The wiring part is housed in the housing 11, 12 of the direct lighting unit 10. Cushions 36 made of a shock absorbing material such as a polyurethane foam may be disposed over the connector 31A and fuse 34, respectively. As shown in FIG. 11, the electric power is supplied to the fluorescent lamp 17 via the cord 33C from the connectors 32A and 32B as in the conventional dome lamp. The fluorescent lamp 17 is switched on and off when the vehicle door is opened and closed, on the basis of a signal that is input from the cords 33A and 33B.

The printed circuit board 40 is disposed inside the housing of cover 21 and lens 23 of the indirect lighting unit 20. The printed circuit board 40 is composed of a protective circuit 41, the control circuit 42 and a connecting circuit 45 in a shape of a printed circuit board (PCB). The ground signal, courtesy lamp signal and power are input into the protective circuit 41 via cords 33A, 33B and 33C. These signals and power are output from the protective circuit 41 to the control circuit 42 via the cords 33A, 33B and 33C.

The control circuit 42 connects an on-off switch 43 and mode switch 44 to a microcomputer or MPU. The on-off switch 43 may be, for example, a push button switch of momentary type to turn on and off a power source for the illumination. The mode switch 44 is a push button switch of momentary type to change an illumination color of the indirect lighting unit 20. The switches are not limited to the described embodiments. The switches may consist of, for example, a toggle switch, a knob, or switch attached to a cord. The on-off switch 43 and mode switch 44 are disposed at fixed positions of the cover 21 so as to be operable, as shown in FIG. 1. The microcomputer transforms a battery voltage (12V) into an LED drive voltage (5V) via a transformer and outputs LED drive pulses described later at a predetermined duty ratio via a pulsed width modulated (PWM) output circuit.

The control circuit 40 is connected with a flexible printed circuit board (PCB) unit 50 via a common lead 46A, lead 46B for red LED chip, lead 46C for green LED chip, lead 46D for blue LED chip and connecting PCB 45. The flexible PCB unit 50 has a flexible printed circuit board (PCB) 51, LEDs 52 and resistors 53. The LEDs 52 are mounted in multiplicity on the flexible PCB 51 in a longitudinal direction thereof. Each LED 52 is made of a three-chip LED having three primary colors of chip LEDs, i.e. red, green and blue chips. The resistor 53 used for limiting current is connected in series with each color chip LED of each LED 52. The common lead 46A is used as an anode common. Then, the power is supplied to the three primary colors of chip LEDs of the LED 52 through the leads 46B, 46C and 46D, respectively. Thus, each chip LED emits light of a desired luminance so that the LED 52 emits light of a desired color and luminance. It is preferable to fix the flexible PCB 51 on the fastening base 25 of the cover 20 via a protective sheet such as a felt.

The process of assembling and operating the vehicle room lamp of the present embodiment is described hereunder.

In assembling vehicle room lamp 2 to the vehicle, the direct and indirect lighting unit 10 and 20 are integrally fitted to the opening 7 of the roof 5, while supporting the indirect lighting unit 20 by the direct lighting unit 10 from the lower side. Specifically, the fixing piece 13 of the housing base 11, initially, is inserted and fitted into the groove 22 of the indirect lighting unit 20, while the translucent cover 12 is detached from the housing base 11. Thus, the housing of cover 21 and lens 23 of the indirect lighting unit 20 is engaged and held by the housing base 11. Next, the direct lighting unit 10 is located in opposition to the opening of the roof 5, while maintaining the housing of cover 21 and lens 23 and housing base 11 in engagement. Then, the fastener 15 or bolt is inserted into the fitting base 14 from the lower side and screwed into a bolt hole formed on the roofing sheet metal 8. Thus, the housing base 11 is fixed to the roof 5 via the fitting units 14, 15, and 16. At the same time, the fixing piece 13 supports the cover 21 at a position of the groove 22, so that the housing of cover 21 and lens 23 is immovably held between the fixing piece 13 and the roof 5. Therefore, the direct and indirect lighting units 10 and 20 can be secured together to the roof 5 at the same time the direct lighting unit 10 is mounted.

Namely, the indirect lighting unit 20 is mounted and fixed automatically to the roof 5 when the direct lighting unit 10 is mounted. Therefore, there is no need to provide individual means or fastener for mounting the indirect lighting unit 20. Consequently, the assembling process of the room lamp 2 can be simplified, so that work efficiency improves and production costs decrease. Moreover, since the lens 23 is provided integrally with the cover 12 in the indirect lighting unit 20, the lens 23 can also be fitted automatically to the roof 5 when the direct lighting unit 10 is attached thereto.

Thereafter, the cover 12 is attached to the housing base 11 and the assembling work of the room lamp is competed. The room lamp 2 mounted to the roof 5 as mentioned above operates as follows.

First, in the present embodiment, the direct lighting unit 10 gives direct illumination by the fluorescent lamp 17 in the same manner as common room lamps, thereby illuminating the cabin space with sufficient brightness. In this case, the fluorescent lamp 17 can be switched on and off in the three conventional operating modes, i.e., an on state, an off state and a door-linked state. When the fluorescent lamp 17 is turned on, the light thereof is uniformly radiated from the translucent cover 12 toward the cabin, thereby evenly illuminating the entire cabin.

On the other hand, the indirect lighting unit 20 sends out light of the LED 52 toward the roof 5 so as to illuminate it, thereby providing indirect illumination to the cabin. At this time, the lens 23 is disposed outside the LED 52 around the outer circumference of the direct lighting unit 10. Thus, the light of the LED 52 is radiated through the lens 23 toward the roof 5. Therefore, the roof 5 can be efficiently irradiated with the light of the LED 52 via the lens 23.

In the present embodiment, the light of the LED 52 is sent out substantially horizontally via the lens 23 toward the roof 5 within a predetermined radiation range R so as to illuminate the entire roof 5, as shown in FIGS. 5, 7 and 9. The LED 52 itself radiates the light with a radiation range shown by two-dot cabin lines in FIG. 3.

Moreover, it is possible to control the light of the LED 52 by lens 23. For example, lens 23 may be converging lens. Such converging lens converge the light of the LED 52 to radiate focused light toward the roof 5 or to irradiate a particular area of the roof 5. Thus, unique illumination effects can be obtained. In this instance, the vehicle room lamp 2 may be structured such that the LEDs 52 emit different color lights, such that the different colors of converged light radiate from the lens 23 corresponding to the LEDs 52. Thus, the illumination effects can be improved. To the contrary, the lens 23 may be a diverging lens. In this case, the diverging lens diverges the light of the LED 52 to radiate diffused light toward the roof 5. Thus, it is possible to obtain more uniform illumination or heighten lighting efficiency. Furthermore, if the shape of the lens 23 is changed in a desired manner, a variety of illumination effects can be achieved accordingly.

The LED 52 may be, for example, the three-chip type LED that is able to emit light of a desired color by mixing three primary colors. Thus, the indirect illumination can be provided in a variety of modes by controlling the control circuit 52. First of all, each time the on-off switch 43 is activated, the LED 52 is repeatedly turned on and off through the control circuit 42 so that the indirect lighting unit 20 is selectively switched on and off. Moreover, each time the mode switch 44 is activated when the indirect lighting unit 20 is turned on, the light color of the LED 52 is switched in a sequence of changing colors determined in advance. For example, the control is such that, each time the mode switch 44 is activated, the light color of the LED 52 is changed over in a sequence of blue, violet, white, red, yellow, green and blue-green. Thus, the illumination color of the indirect lighting unit 20 can be switched in such sequence. Namely, it is possible to give a light color changing function to the indirect lighting unit 20.

Moreover, the indirect lighting unit 20 can be given a door-link function so that it controls the LED 52 to change its light color in accordance with the opening and closing action of the vehicle's door. For example, when the door is closed during driving and so on, the illumination color of the indirect lighting unit 20 illuminates a desired color such as red. When the door is opened, the LED 52 changes to another specific color such as blue regardless of the operation of the on-off switch 43 so as to give an indirect illumination of such color. Moreover, when the door is closed again, the illumination color of the indirect lighting unit 20 returns to the color that was used before the opening of the door. The above control makes it possible for the indirect lighting unit 20 to change the illumination color before and after the door is opened, thereby changing the ambience in the cabin. As a result, unique illumination effects can be obtained by changing the illumination color in accordance with the door opening and closing. Where the indirect lighting unit 20 is switched off before the door is opened, the control may be such that, when the door is closed again, the indirect lighting unit 20 is switched off again.

It is possible to add a light color memorizing function to the indirect lighting unit 20 by the emission control circuit 42 as described below. For example, when the indirect lighting unit 20 is switched off, the control circuit 42 stores in a memory an illumination color that was used before it was turned off. Then, when the indirect lighting unit 42 is lit again, the control circuit 42 controls it to provide an indirect lighting with the illumination color that was used before it was turned off.

Moreover, it is possible to give an automatic power-off function to the indirect lighting unit 20 by the control circuit 42, as mentioned below. For example, if the on-off switch 43 or mode switch 44 is not operated for a predetermined time duration (e.g. one hour) after the LED 52 is switched on, the control circuit 42 controls the LED 52 so that it is automatically turned off.

As described above, the present embodiment of room lamp can satisfy the required functions by the direct lighting unit 10 in the same way as the conventional room lamp. Moreover, it can provide a variety of design or ornamental effects by the indirect lighting unit 20.

For example, since the direct lighting unit 10 is capable of providing sufficient brightness inside the cabin, the illumination color of the indirect lighting unit 20 can be a desired color such as a color other than white, in consideration of illumination effects. Moreover, the indirect lighting unit 20 is not required with original functions that are necessary for the common room lamps. Therefore, the lighting operation can be designed in any desired mode. Furthermore, the light of the indirect lighting unit 20 may be radiated to the roof 5 such that it never disturbs the driver's view. Consequently, the illumination can be maintained even during driving. In addition, the light of the indirect lighting unit 20 does not leak out from the vehicle's cabin, so that the indirect light is never visible from outside of the vehicle. Therefore, the illumination color may be red, without possibly violating any traffic laws or regulations.

As a result, the present embodiment of room lamp 2 satisfies the necessary functions as a vehicle room lamp, while providing a wide variety of choices in the illumination color, lighting operation, illumination mode, etc. Consequently, the design of the product can be manufactured by employing a wide range of design choices.

The inventive indirect lighting unit 20 may be disposed in ways other than the above-mentioned embodiments. It may be disposed at any position as long as it is the outer circumference side of the direct lighting unit 10. For example, the indirect lighting unit 20 may be located at the outer circumference side of the direct lighting unit 10 so that it is exposed from the outer circumference of the direct lighting unit 10. To the contrary, the indirect lighting unit 20 may be disposed inside the direct lighting unit 10 so that it is entirely covered by the direct lighting unit 10 or wholly housed inside (upper side) thereof.

Moreover, the inventive indirect lighting unit 20 may be controlled to emit light in modes other than the above-discussed embodiments. For example, while the color change is carried out manually by the on-off switch 43 and mode switch 44 in the first embodiment, the color may be changed automatically in accordance with various conditions such as brightness in the cabin and so on. The above-structured room lamp is preferably disposed at the center of a roof of a car having a large cabin, particularly a one box car or recreational vehicle. However, the present invention is not limited to large cabin vehicles. It may be installed in any size vehicle.

Figure 12:
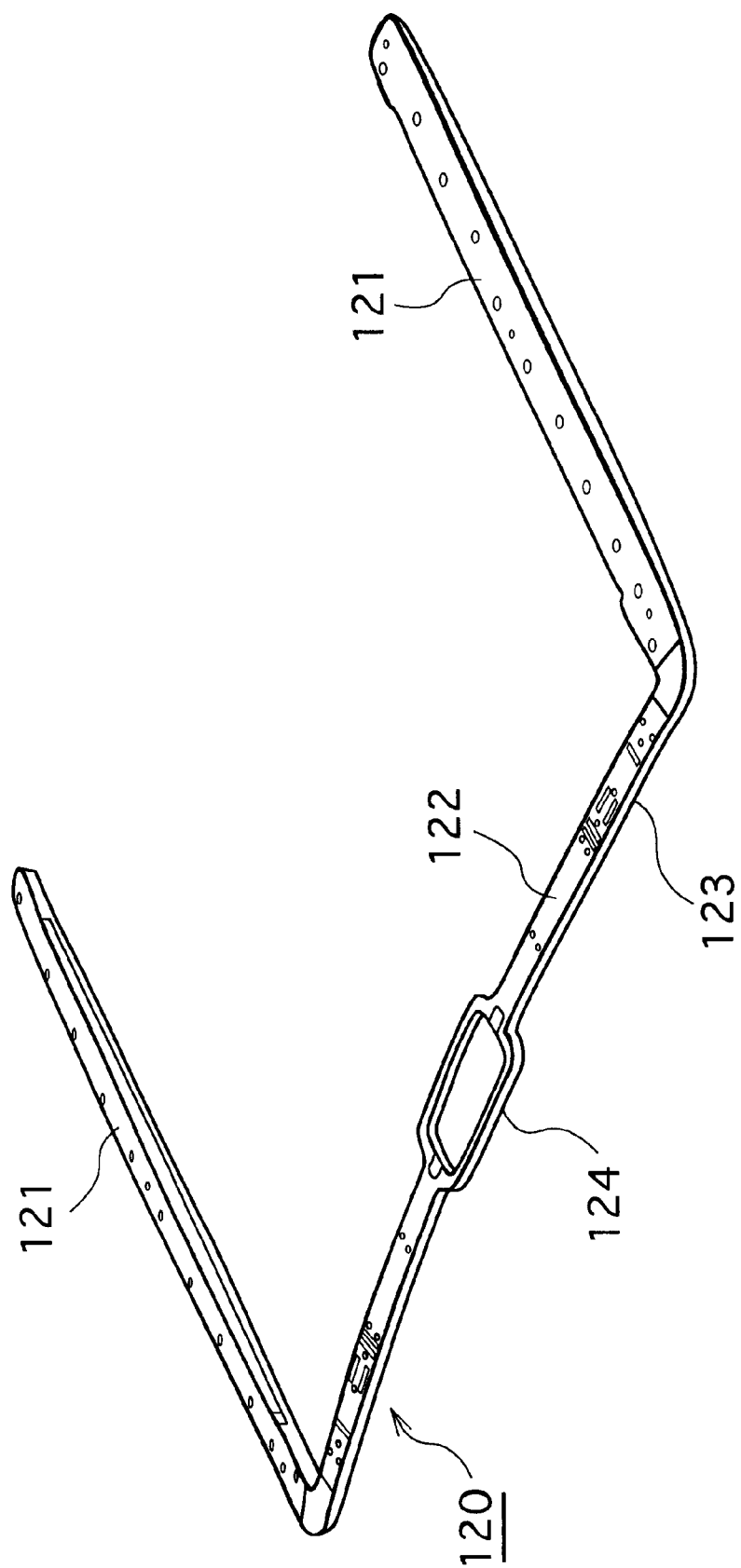
FIG. 12 is a perspective view showing an entire vehicle room lamp according to a second embodiment of the invention.
Figure 13:
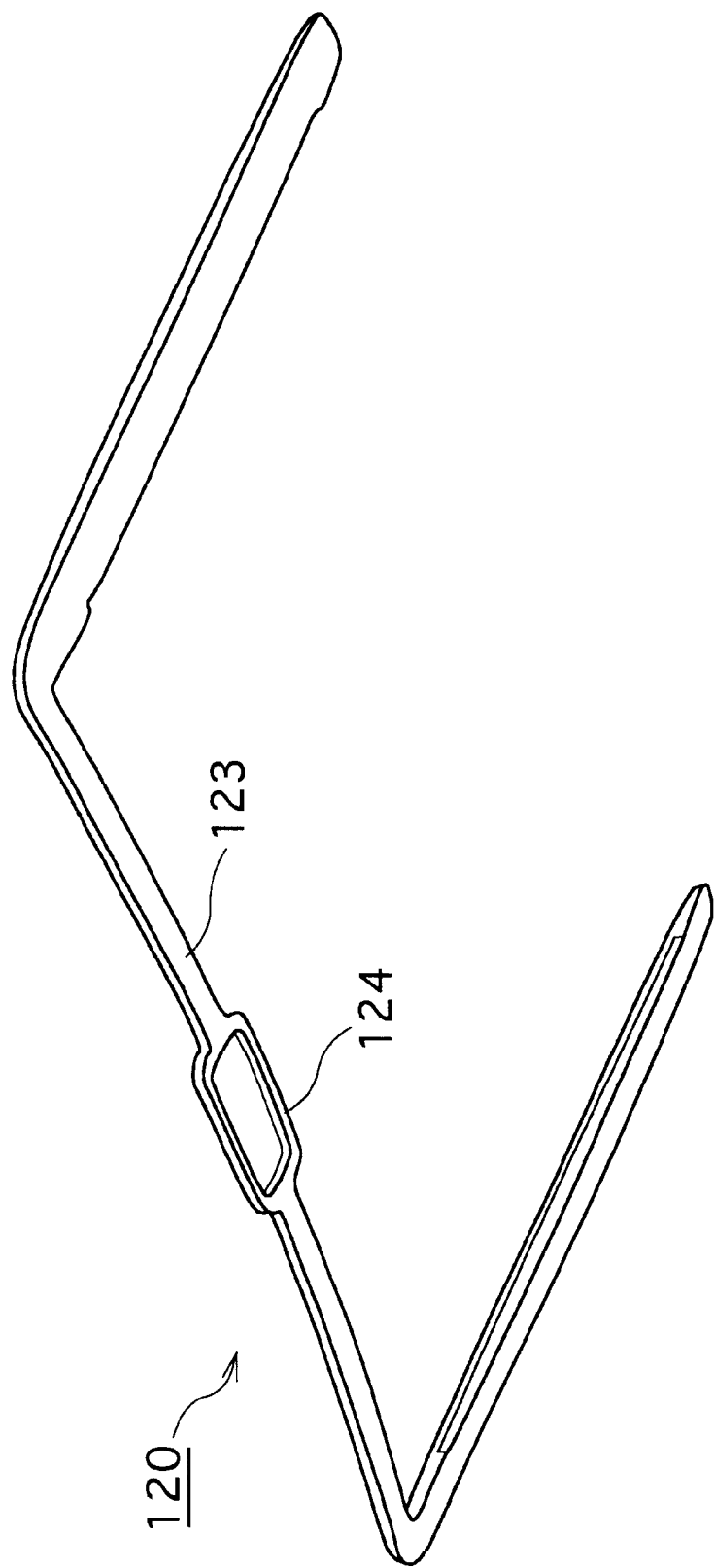
FIG. 13 is a perspective view seen from the rear side of the room lamp of FIG. 12.
Figure 14:
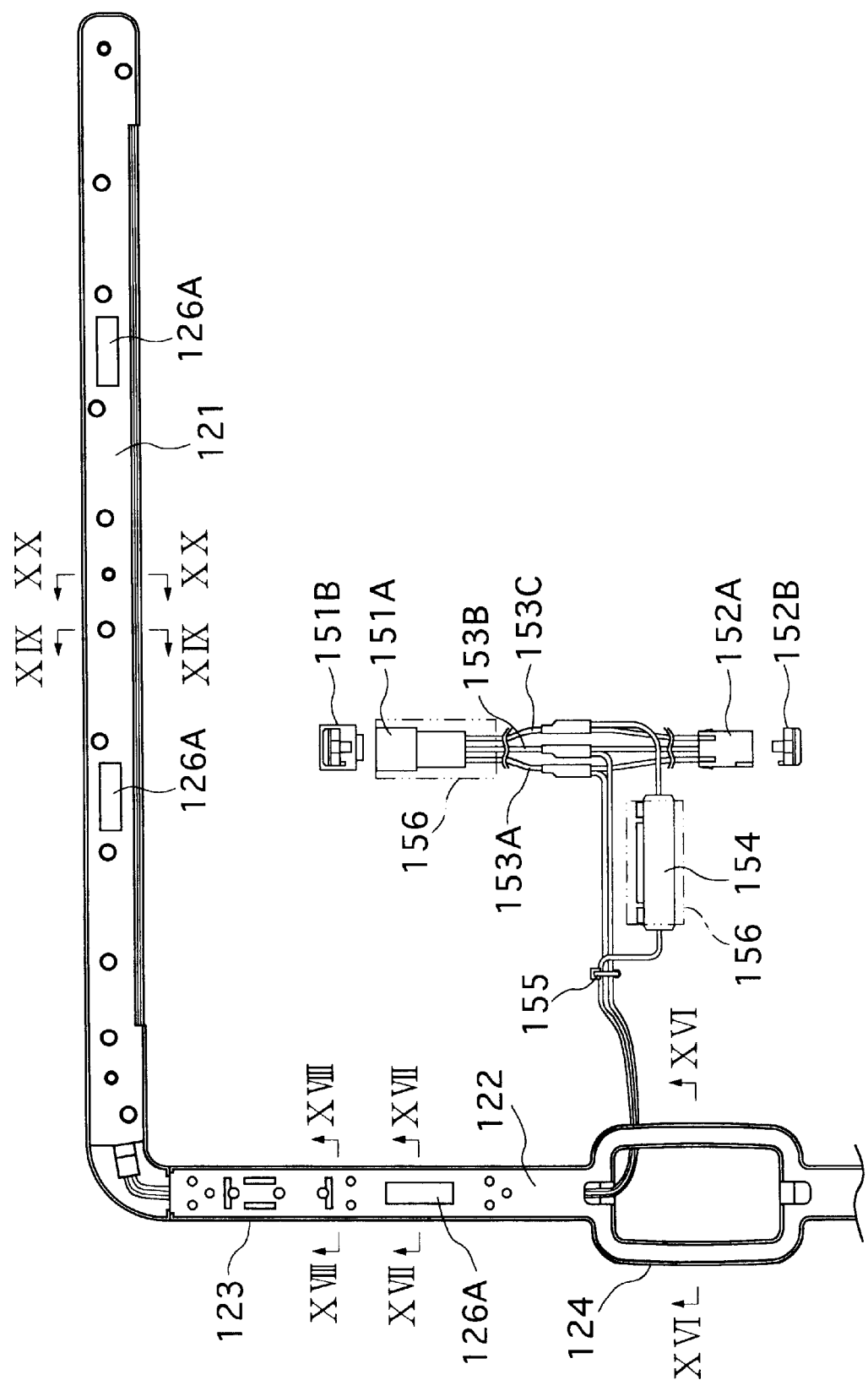
FIG. 14 is a rear side view, depicting a main portion, of the second embodiment of the room lamp of the invention.
Figure 15:
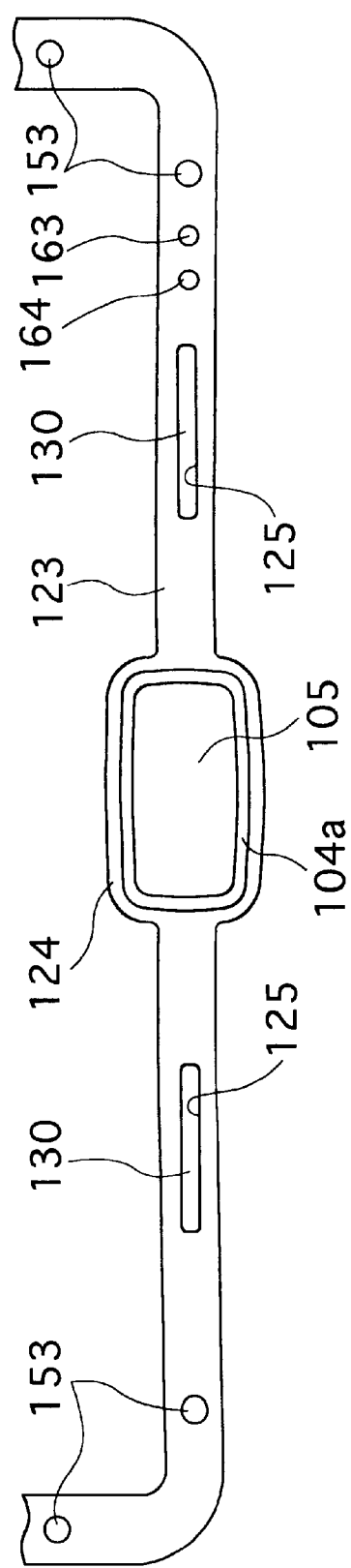
FIG. 15 is a plain view showing the front side of the main portion of the room lamp according to the second embodiment of the invention.
Figure 16:
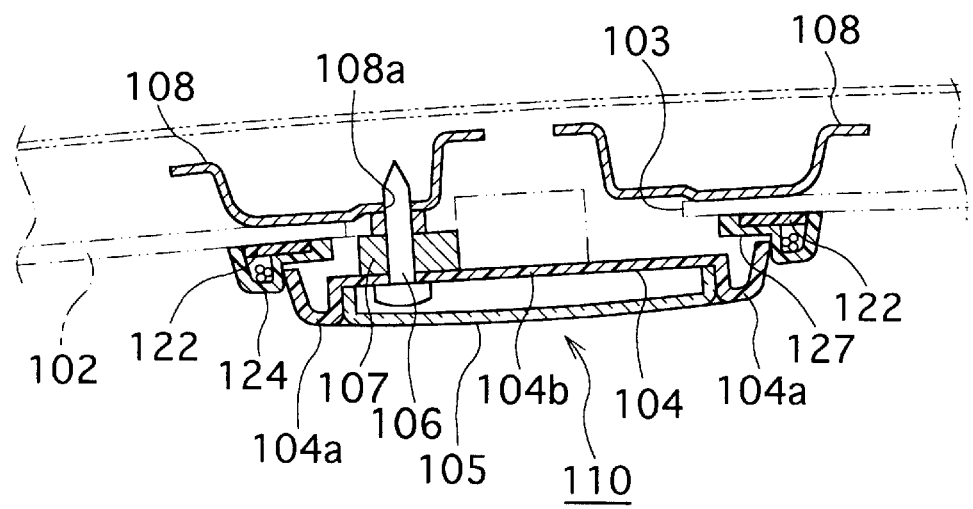
FIG. 16 is a cross-sectional view, showing a relation between the room lamp and a room lamp unit, taken along the line XVI—XVI of FIG. 14.

FIG. 12 illustrates an entire vehicle room lamp according to a second embodiment of the invention. FIG. 13 illustrates the rear side of the room lamp of FIG. 12. FIG. 14 illustrates the rear side, depicting a main part, of the second embodiment of room lamp of the invention. FIG. 15 illustrates a front side of the main part of the room lamp according to the second embodiment of the invention. FIG. 16 illustrates a cross-section showing a relation between the room lamp and a room lamp unit, taken along the line XI—XVI of FIG. 15.

Referring to FIGS. 12 and 13, a housing 120 has substantially a U-shaped outline as a whole or plain view. Referring to FIG. 16, the housing 120 is installed between a room lamp unit 110 and a roof 102. The housing 120 is made of a material such as a polypropylene (PP). The housing base 120 has a pair of side housing bases 121 that is disposed at opposite sides, a center housing base 122 connecting one longitudinal ends of the side housing bases 121 and a cover 123. The cover has substantially a U-shaped outline corresponding to the housing 120 in plain view. A support ring 124 having a ring plan shape is located at the center part of the cover 123. The support ring 124 holds a housing base 104 of the room lamp unit 110 by snap-fit so that an outer circumference of the housing base 104 elastically presses an inner circumferential surface of the support ring 124.

Figure 17:
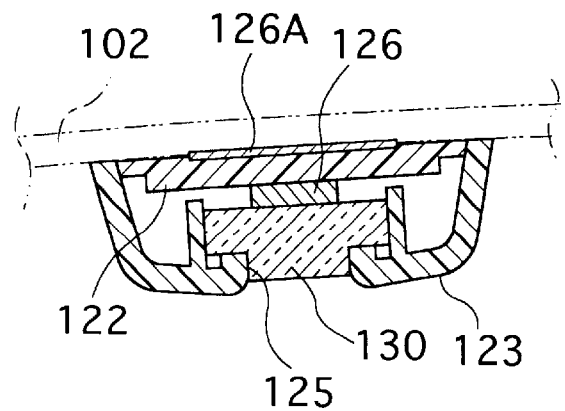
FIG. 17 is a cross-sectional view taken along the line XVII—XVII of FIG. 14.

FIG. 17 illustrates a cross-section taken along the line XVII—XVII of FIG. 15.

Referring to FIG. 17, a pair of light guides 130 is disposed at both sides of the support ring 124 corresponding to a pair of openings of the cover 123. The light guide 130 is made of a light transmitting material such as a polycarbonate (PC) into substantially a plate shape. The light guide 130 has a stepped cross-section with a large width portion and a small width portion. The small width portion of the light guide 130 has the same shape or outline as the opening 125 so that a major surface (lower surface) of the small width portion is exposed from the opening 125 as a whole. The light guide 130 is disposed inside the cover 123 such that a shoulder between the large and small width portions engages an inner end of the cover 123 at the opening 125. The light guide 130 is fixed integrally to the center housing base 122 and cover 123 by a double adhesive coated tape 126*b* made of a sponge. The center housing base 122 is screwed to a rib (not shown), which is placed at a rear side of the cover 123, so that the base 122 and cover 123 define an integral body.

Figure 18:
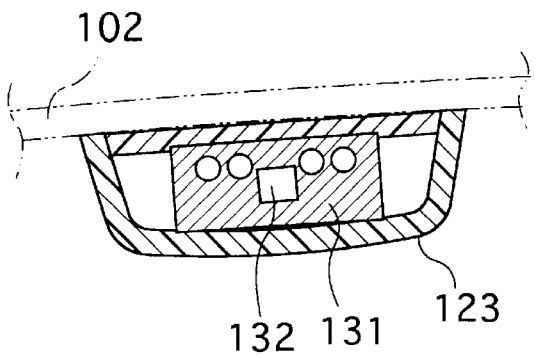
FIG. 18 is a cross-sectional view taken along the line XVIII—XVIII of FIG. 14.

FIG. 18 illustrates a cross-section taken along the line XVIII—XVIII of FIG. 15.

Referring to FIG. 18, a printed circuit board (PCB) 131 is supported on the center housing base 122. The PCB 131 mounts thereon three primary colors of LED chips 132, that are a red LED chip, green LED chip and blue LED chip. The three primary colors of LED chips 132 have their light emission surfaces joined to an end of the light guide 130. Otherwise, the LED chips 132 may have the light emission surfaces facing the end of the light guide 130 at a fixed distance. Thus, a predetermined color and brightness of light emitted from the LED chips 132 extends outward of the exposed surface of the light guide 130.

Figure 19:
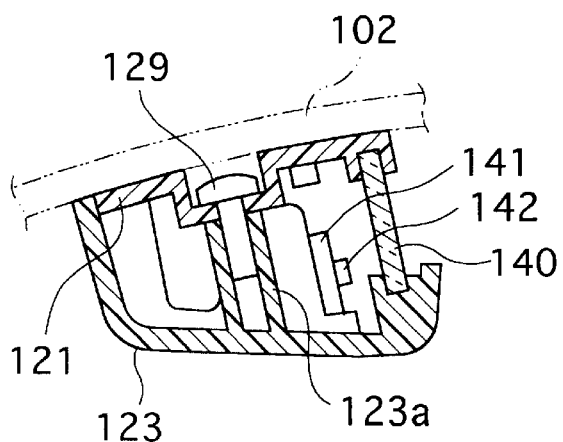
FIG. 19 is a cross-sectional view taken along the line XIX—XIX of FIG. 14.

FIG. 19 illustrates a cross-section taken along the line XIX—XIX of FIG. 15.

Referring to FIG. 19, a light guide 140 of an elongate plate or sheet shape is fitted into an opening that is formed along the inner circumference of each side housing base 121. Thus, the light guides 140 are faced inwardly and opposed to each other at both lateral sides of he housing 120. A printed circuit board (PCB) 141 is fixed at the back of the light guide 140 inside the housing 120. The PCB 141 is supported and secured on the cover 128. The three primary colors of LED chips 142 are mounted on the PCB 141. The LED chips 142 have their light emission surfaces positioned at a fixed distance away from the inner surface of the light guide 140. Thus, a predetermined color and brightness of light emitted from the LED chips 142 are directed out of the light guide 140.

A rib 123*a* protrudes upward approximately from the center of the lower inside surface of the cover 123. The side housing base 121 and cover 123 are joined into one body by one or more screws 129 each of which is driven into the rib 123*a*. Thus, integrally joined base 121, base 122 and cover 123 define the housing 120.

Figure 20:
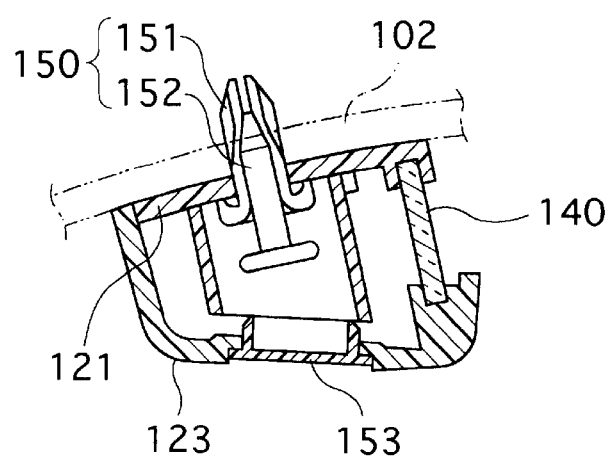
FIG. 20 is a cross-sectional view taken along the line XX—XX of FIG. 14.

FIG. 20 illustrates a cross-section taken along the line XX—XX of FIG. 15.

Referring to FIG. 20, the side housing base 121 and center housing base 122 are fixed to the roof 102 by a snap fastener 150. In the second embodiment, the snap fastener 150 is composed of a clip 151 and an insert pin 152. The clip 151 is fitted into a hole which is formed on the roof 102. The insert pin 152 is inserted into a center hole of the clip 151. The clip 151 and insert pin 152 are located inside the cover 123 via a hole or opening provided on the lower surface of the cover 123. When the insert pin 152 is forced into the clip 151, a leg portion (tubular portion) of the clip 151 is opened or its diameter is enlarged accordingly, thereby fixing the bases 121, 122 to the roof 102. A cap 153 is fitted on the hole of the cover 123 so as to cover or shield a head portion of the insert pin 152 and the hole of the cover 123 from the outside.

Moreover, the present embodiment of room lamp is secured at a fixed location of the roof 102 inside the cabin of the vehicle by attaching the room lamp unit 110 to the support ring 124 of the housing 120.

Specifically, as shown in FIG. 16, the roof 102 has an opening 103 at substantially a center. The room lamp unit 110 is fitted opposite to the opening 103 of the roof 102 at a side of a roof lining. The room lamp unit 110 has the housing base 104 and a light-transmitting cover 105. The housing base 104 is made of a synthetic resin sheet or plate material and the like into a tray-like shape having a dimension corresponding to the opening 103 of the roof 102. The housing base 104 has an opening at a lower end surface. The cover 105 is made of a synthetic resin sheet or plate material and the like into a lid-like shape that covers the lower end opening of the housing base 104. The cover 105 is detachably fitted to the opening of the housing base 104. The cover 105 may be made of any material as long as it can pass the light from the light source, such as a transparent, semi-transparent or colored transparent material. The housing base 104 and cover 105 constitute a housing of substantially a box shape of the room lamp unit 110. A fining piece 104a is formed on an outer circumference of the housing base 104 so as to extend upward in substantially a hook shape. A fitting dent 127 is provided around an entire inner circumference of the support ring. 124 so as to receive the fitting piece 104a. The dent 127 may be formed on part of the inner circumference of the ring 124. If the fitting piece 104a is formed around the whole outer circumference of the housing base 104, the fitting dent 127 is provided on the whole inner circumference of the support ring 124 accordingly. If the fitting piece 104a is formed around part of the outer circumference of the housing base 104, the fitting dent 127 is provided on part of the inner circumference of the support ring 124 accordingly.

A fitting base 104b is formed on an upper surface side of the housing base 104 so as to be opposed to the roof 102 and protruded upward. A fitting unit is integrally provided on the fitting base 104b. The fitting unit consists of a fastener made of screw 106 and spacer 107. The fitting base 14 is fixed by use of the fitting unit. A threaded portion of screw 106 is screwed into the fitting base 104b in an axial direction so as to protrude from an upper end of the fitting base 104b. While the tapping screw is used as the fastener 106 in the present embodiment, another type of fastener may be used such as a clip. The spacer 107 has a disc shape corresponding to an upper end surface of the fitting base 104b. The spacer 107 is fixed on the upper end surface of the fitting base 104b by a double adhesive coated tape or the like. The fastener or the screw 106 is inserted from a lower end of the fitting base 104b and screwed into a hole 108a that is formed on a roofing sheet metal 108. Thus, the housing base 104 is secured to the roof 102.

Figure 21:
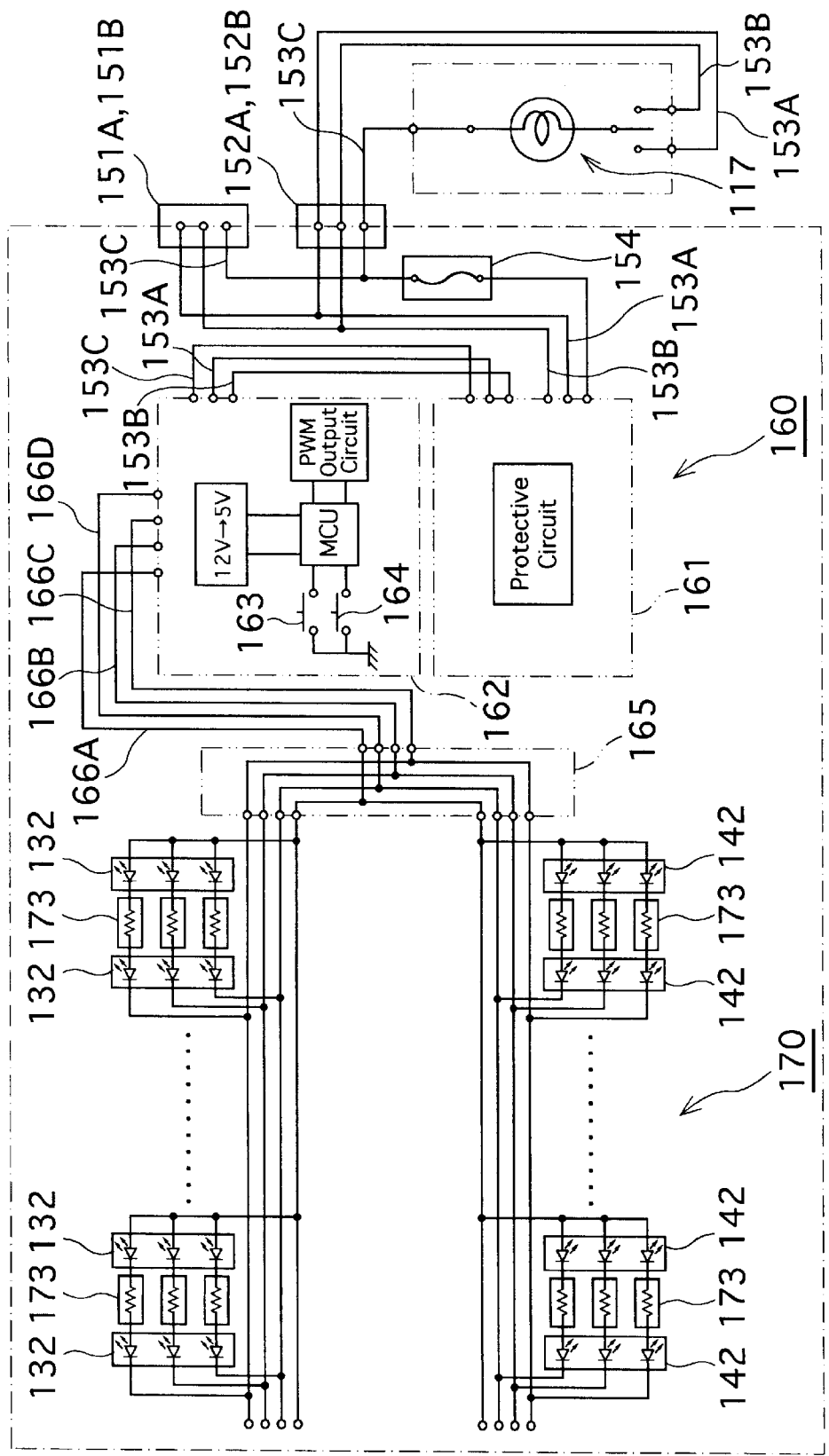
FIG. 21 is a diagram showing an electric circuit of the second embodiment of room lamp of the invention.

A lamp 117 is attached inside the housing base 104 as a light source shown in FIG. 21. The lamp 117 may be made of a bulb, fluorescent lamp or the like. The housing base 104, cover 105 and lamp 117 constitute a room lamp (dome lamp).

Two switches are disposed on the center housing base 122 of the housing 120 between the support ring 124 and one of the side housing base 121, i.e. between the support ring 124 and the right side opening 125 shown in FIG. 15. One of the switches is an on-off switch 163 for switching on and off the lamp as well as adjusting brightness. The other of the switches is a mode switch 164 for controlling emitted light color.

An electric configuration of the room lamp according to the second embodiment is described hereafter. FIG. 21 illustrates an electric circuit of the second embodiment of room lamp.

Referring back to FIG. 21, the housing base 104 of the room lamp unit 110 houses therein a connector 151A and a connector 152A. The connector 151A is connected to a vehicle wiring harness connector 151B. The connector 152A is connected to a dome lamp connector 152B. The connectors 151A and 152A are made up of a 3P connector and connected by cords 153A, 153B and 153C. The cord 153A serves to supply a ground signal. The cord 153B acts to supply a courtesy lamp signal. The cord 153C functions to supply an electric power from a battery.

Each of the cords 153A, 153B and 153C branches near the middle thereof. The three branch lines are connected to a control circuit 160 described later. The branch line of the power supplying cord 153C is connected to the control circuit 160 via a fuse 154 for shutting off an overcurrent. The branch lines of the cords 153A, 153B and 153C are bound by a binding band 155 and guided to the control circuit 160. A wiring part is constituted by the connectors 151A, 151B, 152A, 152B, cords 153A, 153B, 153C and fuse 154. The wiring part is housed in the room lamp unit 110.

The electric power is supplied to the lamp 117 via the cord 153C from the connectors 152A and 152B. The lamp 117 is switched on and off when the door is opened and closed, on the basis of a signal that is input from the cords 153A and 153B.

The control circuit board 160 is disposed inside the housing 120. The control circuit 160 is composed of a protective circuit 161, PWM control circuit 162 and connecting circuit 165. The ground signal, courtesy lamp signal and power are input into the protective circuit 161 via the cords 153A, 153B and 153C. These signals and power are output from the protective circuit 161 to the PWM control circuit 162 via the cords 153A, 153B and 153C.

The PWM control circuit 162 connects the on-off switch 163 and mode switch 164 to a microcomputer or MPU. The on-off switch 163 is a push button switch to turn on and off a power source for the illumination as well as to set brightness of the illumination. The mode switch 164, may be, for example, a push button switch to change an illumination color of the housing 120. The on-off switch 163 and mode switch 164 are disposed at fixed positions on the cover 121 so as to be operable, as shown in FIG. 15. The microcomputer lowers a battery voltage (12V) to an LED drive voltage (5V) and outputs LED drive pulses described later at a predetermined duty ratio via a PWM output circuit.

The control circuit 160 is connected with a flexible printed circuit board (PCB) unit 170 via a common lead 166A, lead 166B for red LED chip, lead 166C for green LED chip, lead 166D for blue LED chip and connecting PCB 165. The flexible PCB unit 170 has three primary colors of LED chips 132, 142 and resistors 173. The LED chips 132, 142 are mounted in multiplicity on each side housing base 121 in a longitudinal direction thereof. Each LED chip 132, 142 is made of a three-chip LED having three primary colors of chip LEDs, i.e. red, green and blue chips. The resistor 173 used for limiting current is connected in series with each color of chip LED of each LED chips 132, 142. The common lead 166A is used as an anode common. Then, the power is supplied to the LED chips 132, 142 through leads 166B, 166C and 166D, respectively. Thus, each chip LED emits light of a desired luminance such that the LED chip 132, 142 emits light of a desired color and luminance. The control circuit 160 is secured inside the housing 120 via a protective sheet such as felt.

The assembling and operating processes of the vehicle room lamp of the present embodiment are described hereunder.

In assembling the room lamp to the vehicle, the room lamp unit 110 and housing 120 are integrally fitted to the opening 103 of the roof 102, while supporting the housing 120 by the room lamp unit 110 from a lower side. Specifically, the fixing piece 104a of the cover 104, initially, is inserted and fitted into the groove 127 of the support ring 124, while the translucent cover 105 is detached from the housing base 104. Thus, the housing 120 is engaged and held by the housing base 104. Next, the fastener 106 or tapping screw is inserted into the fitting base 104b and spacer 107 and screwed into a bolt hole 108a of the roofing sheet metal 108. Thus, the housing base 104 is fixed to the roof 102. Simultaneously, the fixing piece 104a presses the support ring 124 from the lower side of the groove 127, so that the housing 120 is immovably held between the fixing piece 104a and the roof 102. Thereafter, the cover 105 is attached to the housing base 104. Thus, the assembling work of the vehicle room lamp is finished. Therefore, housing 120 can be secured to the roof 102 together and simultaneously with the mounting the room lamp unit 110.

Namely, the housing 120 is mounted on the roof 102 at the same time when the room lamp unit 110 is mounted. Therefore, it is enough to fix the housing bases 121, 122 to the roof 102 for fitting the other part of the housing 120. Consequently, the assembling work of the room lamp as a whole can be implemented in an easier manner, so that work efficiency of the assembly process improves and the production costs decrease.

The room lamp mounted to the roof 102 as mentioned above operates as follows.

First, in the present embodiment, the room lamp unit 110 functions as a common room lamp, thereby lighting up the cabin space with sufficient brightness. In this case, the lamp 117 can be switched on and off in the three conventional operating modes, i.e. an on state, an off state and a door-linked state. When the lamp 17 is turned on, the light thereof is uniformly radiated from the translucent cover 105 toward the cabin, thereby illuminating the cabin.

On the other hand, the cabin is illuminated by the light of a fixed color and brightness that is emitted from the LED chips 132, 142 inside the housing 120. At this time, the light of the LED chips 132, 142 irradiate the roof 102 to provide unique illumination effects like an indirect lighting. The LED chips 132, 142 are the three-chip type LED that are able to emit light of a desired color by mixing the three primary colors. Thus, the illumination can be provided in a variety of modes by control of the PWM control circuit 162.

First of all, each time the on-off switch 163 is activated, a ring counter installed in the PWM control circuit 162 operates so that a duration of the on and off of the LED chip 132, 142 is changed, thereby controlling the brightness. Moreover, each time the mode switch 164 is activated when the LED chip 132, 142 is turned on, the ring counter operates so that the light color of the LED chip 132, 142 is switched in a sequence of changing colors determined in advance. For example, the control is such that, each time the mode switch 164 is activated, the light color of the LED chip 132, 142 is changed over in a sequence of white, red, orange, yellow, green, blue-green, blue and violet. Thus, the illumination color of the housing 120 can be switched in such sequence.

Moreover, the housing 120 can be given a door-link function that controls the LED chips 132, 142 to change the light color in accordance with the door opening and closing action. For example, when the door is closed during driving and so on, the illumination color of the housing 120 is maintained at a desired color such as green. When the door is opened, the LED chips 132, 142 are lit as another specific color such as blue regardless of the operation of the on-off switch 163 so as to give an illumination of such color. As a result, unique illumination effects can be obtained by the illumination color change in accordance with the door opening and closing. Where the LED chips 132, 142 are switched off before the door is opened, the control may be such that, when the door is closed again, the LED chips 132, 142 are switched off again.

As described above, the present embodiment of the room lamp can satisfy the required functions by the room lamp unit 110 in the same way as the conventional room lamp. Moreover, it can provide a variety of design or ornamental effects by the LED chips 132, 142 in the housing 120.

For example, since the room lamp unit 110 is capable of providing sufficient brightness inside the cabin, the illumination color of the LED chips 132, 142 can be a desired color such as a color other than white, in consideration of illumination effects. Moreover, the LED chips 132, 142 are not required with original functions that are necessary for the common room lamps. Therefore, the lighting operation can be implemented in any desired mode. Furthermore, the light of the LED chips 132, 142 is radiated to the roof 102 so that it never disturbs view of a driver. Consequently, the illumination can be maintained even during the driving. In addition, the light of the housing 120 does not leak out from the cabin, so that the light is never visible from the outside. Therefore, the illumination color can be red and will not violate any traffic regulations and laws.

As a result, the present embodiment of room lamp satisfies the necessary functions as the vehicle room lamp, while providing a wide variety of choices in the illumination color, lighting operation, illumination mode, etc. Consequently, a wide range of design choices can be used to produce the present invention.

As described above, the LED chips 132, 142 inside the housing 120 can be controlled to change their light color as well as brightness. If the control is PWM control, these functions of light color change and brightness change can be achieved without a special circuit therefor.

Moreover, the housing 120 is fitted to the roof 102 simultaneous with mounting of the room lamp unit 110. Therefore, a laborious work installation process is eliminated during the assembly process of the room lamp unit. For example, a conventional assembling work procedure can be used for the inventive room lamp, so that the work can be easy. In the present embodiment, the bases 121, 122 are joined to the roof 102 via pressure sensitive adhesive double coated tapes 126A, respectively, in order to stabilize their fitting.

In addition, the center portion of the housing 120 serves to mount the room lamp unit 10, so that it securely fits to the roof 102. Moreover, the LED chips 142 illuminate the roof 102, while the LED chips 132 illuminate downward. Moreover, the light guides 130, 140 planarly emit light. Therefore, such lighting does not generate a reflection from an instrument panel, which may affect the driving ability of a driver. Furthermore, if the LED chips 132 are made darker while the LED chips 142 axe made brighter, the illumination can be such that the emitted light does not affect the driving operation of the driver, and the light is not visible from the outside of the vehicle.

While both groups of the LED chips 132 and LED chips 142 are lit at the same time particularly in the present embodiment, the control may be such that one group of the LED chips 132 and 142 be switched alternately to emit respective lights.

In addition, the illumination color can be changed as desired by pressing the mode switch 164. The brightness of the illumination can be changed by pressing the on-off switch 163, so that a brightness can be obtained according to the user's preferences.

While the LED chips 132, 142 are made of three primary colors of chip LEDs in the present embodiment, LED lamps may be used in the invention. Anyway, a plurality of LEDs made of three primary colors of LEDs can be used in the inventive room lamp.

Moreover, when the light guides 130, 140 guide the light of the LED chips 132, 142 in the cabin for illumination, the light guide 130 permits the light to enter the cabin and repeatedly scatter the incident light while passing the light, thereby emitting the light in a uniform manner. Moreover, the light guide 140 passes and diffuses the light therein so as to emit the uniform light from the overall surface. One or both of the light guides 130 and 140 may be used for such purpose in the invention. Any structure can be adopted as long as it eliminates direct light and planarly emits the light in a substantially uniform manner.

While the control circuit 160 is composed of the protective circuit 161, PWM control circuit 162 and connecting circuit 163 in the embodiment, any circuit may be used as long as it can control the emission of the light from the LED chips 132, 142. While the on-off switch 163 and mode switch 164 are used as the switches for the light control in the embodiment, one switch may be used in the invention to perform both functions. Otherwise, another switch may be added to carry out additional functions.

Figure 22:
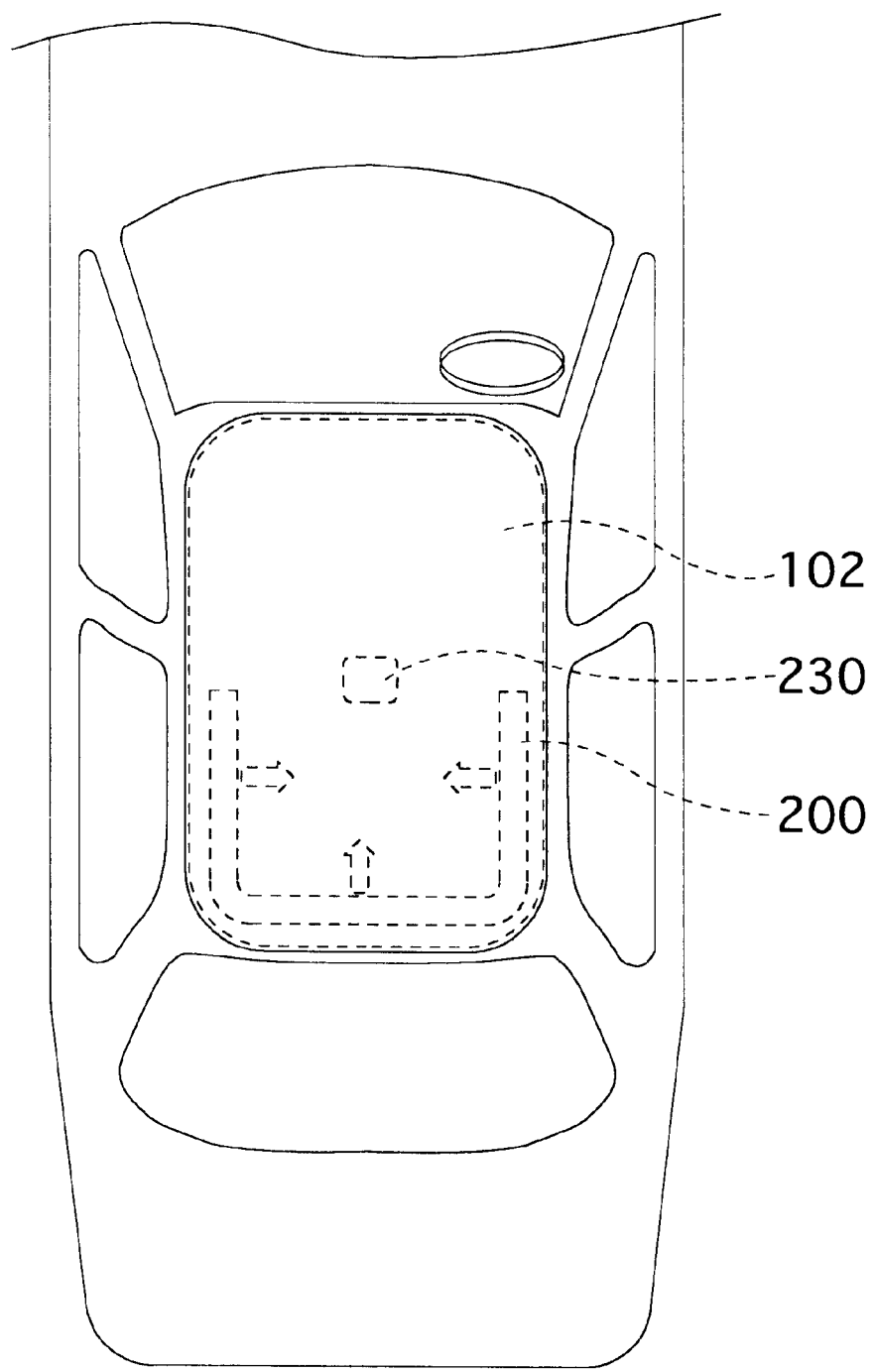
FIG. 22 is a plain view of a third embodiment of the vehicle room lamp of the invention that is disposed on the roof of a vehicle.
Figure 23:
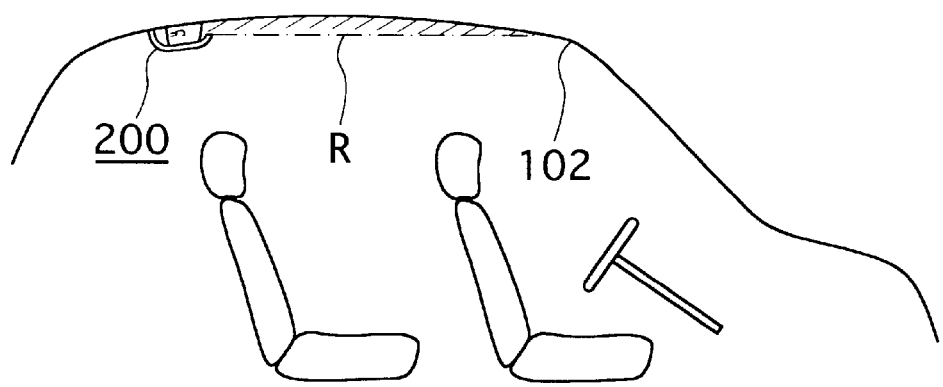
FIG. 23 is an explanatory drawing showing the third embodiment of the room lamp viewed from a lateral side thereof.
Figure 24:
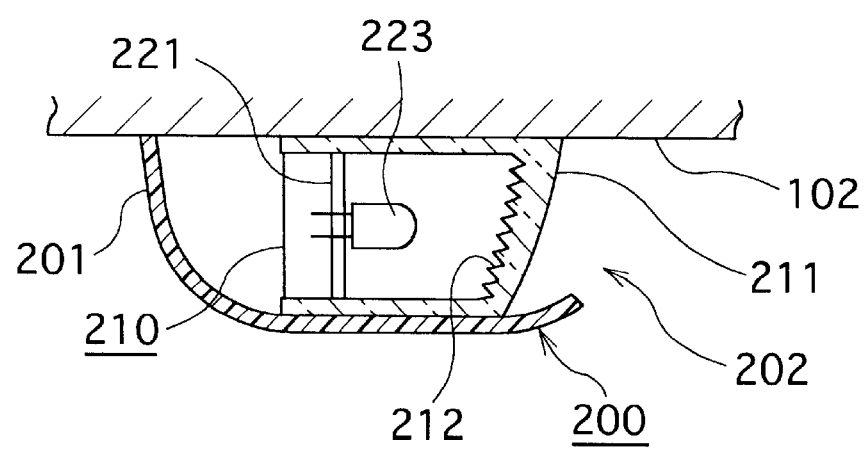
FIG. 24 is a cross-sectional view of the third embodiment of the room lamp of the invention.
Figure 25:
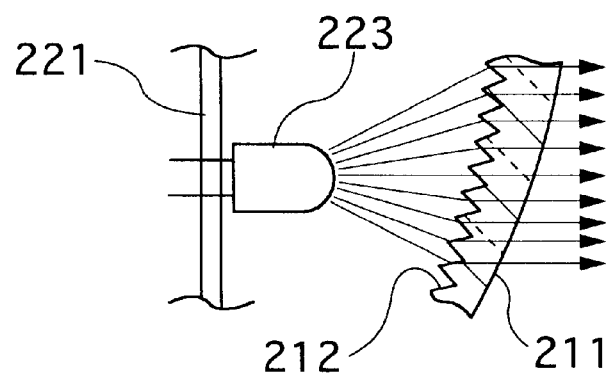
FIG. 25 is an explanatory drawing showing the light converging operation of a light guide plate of the third embodiment of the room lamp of the invention.

FIG. 22 illustrates a third embodiment of vehicle room lamp of the invention that is disposed on the roof of a vehicle. FIG. 23 illustrates the third embodiment of room lamp seen from a lateral aide thereof. FIG. 24 illustrates a cross-section of the third embodiment of room lamp of the invention. FIG. 25 illustrates a light converging operation of a light guide plate of the third embodiment of room lamp of the invention.

An indirect lighting unit 200 as the present embodiment of vehicle room lamp has a cover 201 made of a synthetic resin material or the like into substantially a U-shape in plain view. The cover 201 is fixed to the roof 102 so as to extend continuously along a periphery of a rear half of the roof 102, i.e. a rear edge and right and left edges of the rear half. The cover 201 is made of a sheet material into a small thickness. An opening 202 is formed between an inner edge of the cover 201 and the roof 102. A housing 210 is housed on the inside space of the cover 201 and secured to the roof 102.

The housing 210 has substantially a U-shape in plain view corresponding to the cover 201. The housing 210 is disposed almost over the full length of the cover 201. The housing 210 has substantially a U-section that has an opening at one width end (left end in FIG. 24) or an outer side. A lens 211 of a flat plate or sheet shape is integrally formed over the other width end (right end in FIG. 24) or an inner aide of the housing 210. Namely, the housing 210 is integrally made of a light transmitting material such as PC resin into the aforementioned plan shape and cross-sectional shape. The lens 211 has substantially a U-shape in plain view corresponding to the entire shape or outline of the housing 210. The lens 211 is disposed continuously along the inside surface of the housing 210. The housing 210 has an upper outside surface fixed to the roof 102 by a fastener (not shown) such as a screw or clip.

A lens surface 212 is integrally formed on an inside surface of the lens 211. The lens surface 212 is provided continuously along nearly a full length of the inside surface of the lens 211. The lens surface 212 has a saw-like cross-section that has protrusions or dents successively formed in a vertical direction. Thus, each ridge of the lens surface 212 extends continuously in a longitudinal direction of the lens 211. Namely, many triangular columns constituting the lens surface 212 extend in parallel with each other and continuously in the longitudinal direction of the lens 211. The lens surface 212 vertically converges diffused light, which enters from the inside surface of the lens 211, and transforms it into parallel rays, thereby sending out the parallel rays from the outside surface of the lens 211.

A flexible printed circuit board (PCB) 221 is secured in the housing 210. The flexible PCB 221 stands upright inside the housing 210, while disposed along substantially the full length of the housing 210. Namely, the flexible PCB 221 has flexibility or elasticity so that it is disposed inside the housing 210 while bent or curved in the U-shape in plain view corresponding to the outline of the housing 210. Many LED lamps 223 as LEDs are mounted at predetermined intervals on a front surface side of the flexible PCB 221 so as to be opposite to the lens 211. Thus, the lens 211 is located at a position facing light emission side of the LED lamps 223 in the housing 210. Thereby, the lens surface 212 converges the diffused light from the LED lamps 223 in the vertical direction to transduce it into the parallel rays, thereby radiating the parallel rays toward the cabin space.

Each LED lamp 223 is a so-called dome LED lamp and a three chip type LED having three primary colors of chip LEDs: red, green and blue chip LEDs. The LED lamp 223 makes each chip LED emit light at a desired luminance so as to emit light as a whole at a desired color and luminance. The flexible PCB 221 and LED lamp 223 are attached to the interior of the housing 210 through the opening of the outside periphery of the housing 210.

It is preferable to provide a lining material on a rear surface of the flexible PCB 221 for the purpose of stable mounting and protection for the LED lamps 223. A protective sheet like a felt can be used as the lining material. The LED lamps 223 may be controlled by the emission control circuit as described in the first and second embodiments so that they are able to emit light in a desired light emitting mode. For example, the LED lamps 223 may be given the illumination color changing function, brightness selecting function, door-linked illumination function, illumination color memorizing function, auto-power-off function and the like. Moreover, the electric configuration of the present embodiment of room lamp may be the same as that of the first or second embodiment of room lamp. In the present embodiment, a conventional direct lighting unit (room lamp unit) 230 is disposed at a center of the roof inside the cabin.

Operation of the present embodiment of room lamp is described below.

First, the room lamp unit 230 gives an illumination of sufficient brightness to light up the cabin. Moreover, the present embodiment of room lamp acts as the indirect lighting unit 200 and illuminates the roof 102 so as to indirectly light up the cabin. In this embodiment, the lens surface 212 of the lens 211 is opposed to the light emission side of the LED lamps 223 so as to perform a predetermined lens effect. Namely, the diffused light emitted from the LED lamps 223 are converged into parallel rays via the lens surface 212 when passing the lens 211. Such parallel rays are radiated from the outer surface of the lens 211 toward the roof 102.

Consequently, the light of the LED lamps 223 can be efficiently radiated to the roof 102 outside the indirect lighting unit 200. Moreover, radiated from the lens 211 are parallel rays that are never diffused in the vertical direction but the width is kept constant. Therefore, an irradiation range R of the light emitted from the indirect lighting unit 200 is never spread in the vertical direction, as shown in FIG. 25. Thus, the illumination light of the indirect lighting unit 200 travels only along the upper end of the cabin or along the roof 102 so as not to affect the view of the driver. That is, there is no light spread downward or reflected from a rear view mirror and so on, so that the driver's view is never obstructed. As a result, the driver does not experience any interference if the indirect lighting unit 200 is lit during driving. In addition, the light from the indirect lighting unit 200 never leaks outside the cabin. Thus, the light of the indirect lighting unit 200 is never visible from the outside of the vehicle. Therefore, the illumination color can be a color such as red and still not violate any traffic laws or regulations.

Consequently, the indirect lighting unit 200 of the present embodiment satisfies required functions, while providing a variety of illumination colors, lighting operations, illumination modes or effects, etc. Thus, the room lamp as a product has many choices in design and ornamentation styles.

In the present embodiment, the indirect lighting unit 200 is located at the rear half of the roof 102 along the roof's circumference. Therefore, three kinds of lights are radiated as follows: parallel rays traveling forward from the rear edge of the roof 102, parallel rays traveling left from the right edge of the roof 102 and parallel rays traveling right from the left edge of the roof 102. Namely, these three kinds of lights are overlapped at the rear half of the roof 102, thereby providing an indirect illumination of increased brightness. Moreover, the light color of the LED lamps 223 located at the rear edge of the roof 102 may be a different from the light color of the LED lamps 223 located at the right and left edges of the roof 102. With such structure, the rear half of the cabin is illuminated by their mixed color, while a front half of the cabin being illuminated by the light color of the rear side LED lamps 223. As a result, the indirect lighting can have a more colorful ornamental effects, thereby providing the vehicle's passengers with a unique atmosphere.

Figure 26:
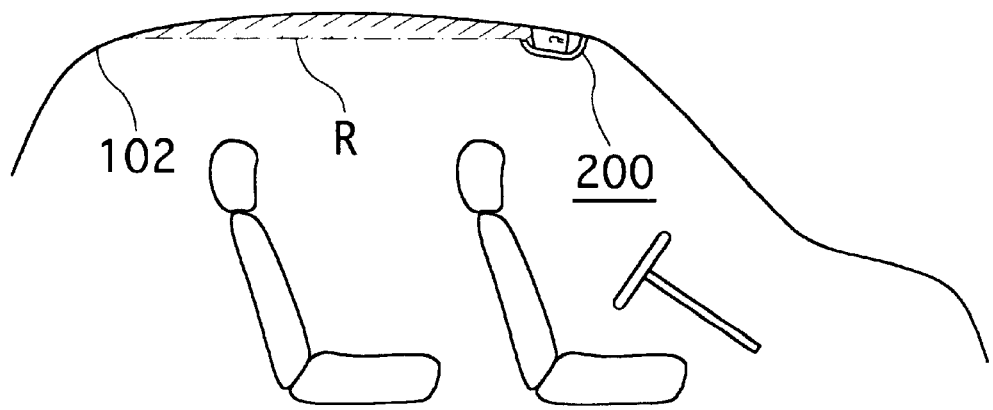
FIG. 26 is a plain view of a fourth embodiment of the vehicle room lamp of the invention that is disposed on the roof of a vehicle.

FIG. 26 illustrates a fourth embodiment of vehicle room lamp of the invention that is disposed on a roof of a vehicle.

An indirect lighting unit 200 as a vehicle room lamp according to the fourth embodiment is disposed at a place different from the third embodiment. The present embodiment of indirect lighting unit 200 is placed at the front half of the roof 102 along the circumference, contrary to the third embodiment. Namely, the indirect lighting unit 200 is fixed to the roof 102 so as to extend continuously over a front edge as well as right and left edges of the front half of the roof. The structure of the indirect lighting unit 200 itself is the same as that of the third embodiment.

The fourth embodiment of room lamp has the same functions, effects, and advantages as those of the third embodiment, except that the indirect light travels backward from the front half of the upper end of the cabin. Particularly, at the front half of the cabin, the backward parallel rays from the front edge, rightward parallel rays from the left edge and leftward parallel rays from the right edge are overlapped. Then, it is possible to obtain an indirect illumination with increased brightness by the overlapped light. Moreover, as described in the third embodiment, the light color of the front edge LED lamps 223 can be changed from the light color of the right and left edge LED lamps 223. In this case, the front half of the cabin is given an illumination of mixed colors. The rear half of the cabin is give an illumination of the color of the front edge LED lamps 223.

Figure 27:
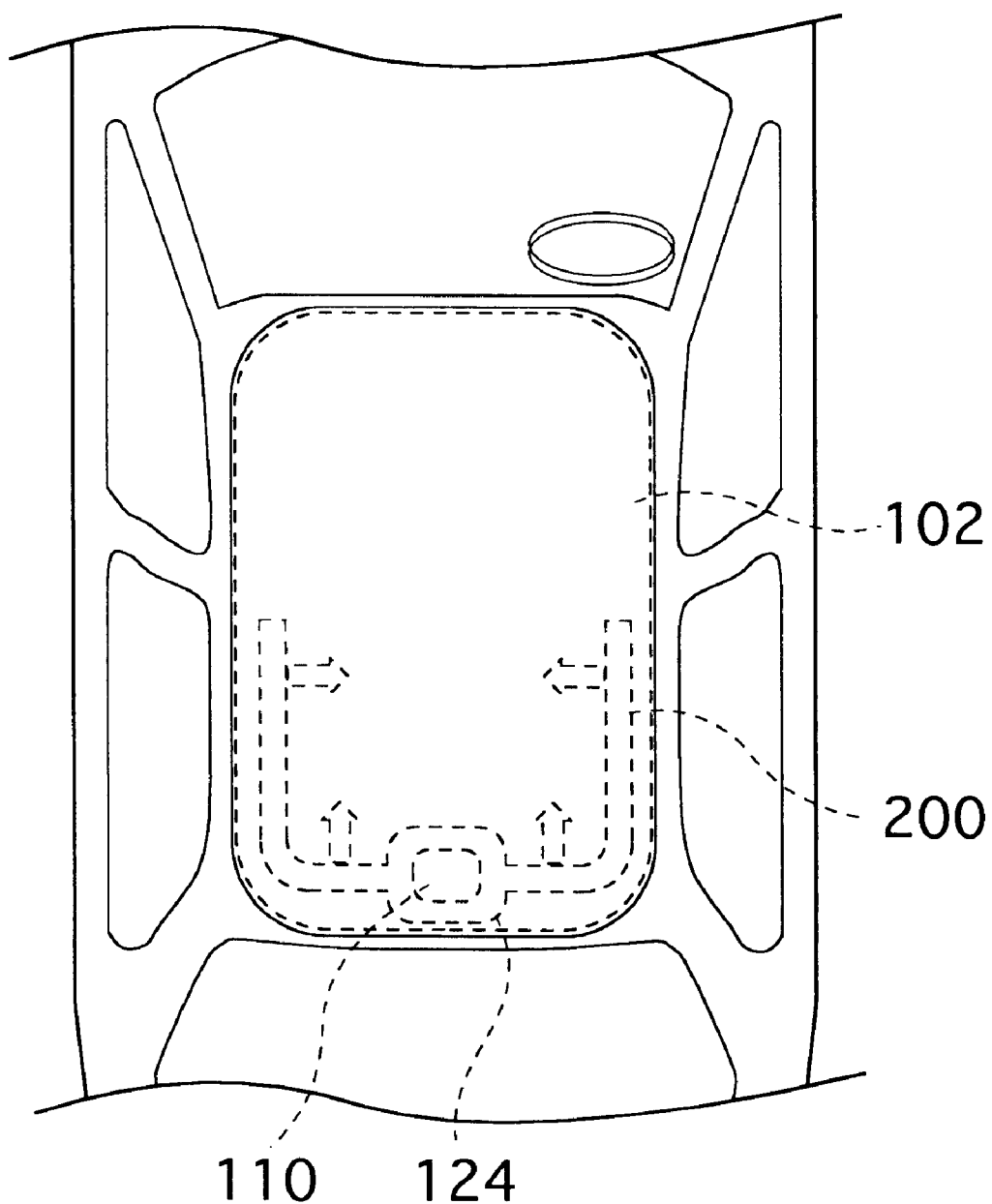
FIG. 27 is a plain view of a fifth embodiment of the vehicle room lamp of the invention that is disposed on a roof of a vehicle.

FIG. 27 illustrates a fifth embodiment of vehicle room lamp of the invention that is disposed on a roof of a vehicle.

The fifth embodiment of room lamp is constructed such that it integrally provides the indirect lighting unit 200 of the third embodiment with the support ring 124 of the second embodiment. Thus, the room lamp unit 110 is unified with the indirect lighting unit 200. The present embodiment of room lamp is disposed along the circumference of the rear half of roof 102, as in the third embodiment. Namely, a center elongate part of the indirect lighting unit 200 where the room lamp unit 100 and is fitted is located at the rear edge of the roof 102. Right and left elongate parts that extend forward from the center part are placed at the right and left edges of the rear half. The indirect lighting unit 200 has the same structure in itself as that of the third embodiment. Moreover, the support ring 124 and room lamp unit 110 have the same structures as those of the second embodiment.

The fifth embodiment of room lamp is located and fixed on the roof 102 inside the cabin by mounting the room lamp unit 110 on the support ring 124 as in the second embodiment. Then, the present embodiment of room lamp has the functions, effects and advantages of the room lamp unit 110 of the second embodiment, in addition to the functions, effects and advantages of the third embodiment. Namely, the indirect lighting unit 200 can be mounted and fixed on the roof 102 at the same time when the room lamp unit 110 is fitted on the roof 102. Moreover, the room lamp unit 110 acts as the direct lighting unit so as to illuminate the cabin with sufficient brightness. On the other hand, the indirect lighting unit 200 provides an indirect illumination with a variety of lighting modes.

Figure 28:
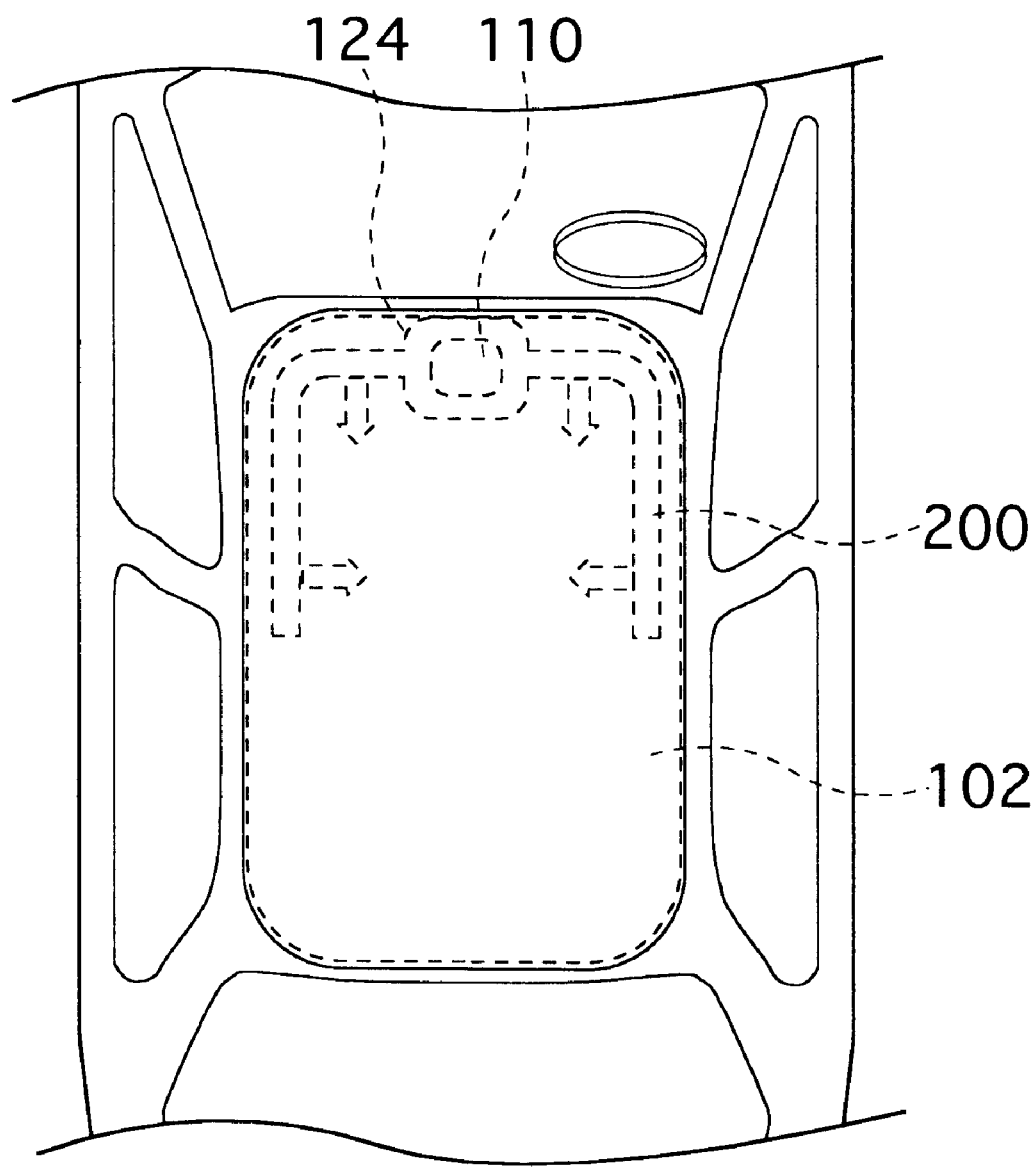
FIG. 28 is a plain view of a sixth embodiment of the vehicle room lamp of the invention that is disposed on the roof of a vehicle.

FIG. 28 illustrates a sixth embodiment of vehicle room lamp of the invention that is disposed on a roof of a vehicle.

In the sixth embodiment of room lamp, the room lamp of the fifth embodiment is disposed along the circumference of the front half of the roof 102 of the cabin, to the contrary to the fifth embodiment. Namely, the center elongate part of the indirect lighting unit 200 is located at the front edge of the roof 102. The right and left elongate parts are placed at the right and left edges of the front half of the roof. The other structure is the same as the fifth embodiment.

The sixth embodiment of room lamp has the same functions, effects and advantages as the fifth embodiment, except that the indirect light travels along the upper end of the front half toward the rear half of the cabin.

The inventive room lamp can be modified as desired as long as it has a plurality of LEDs on the roof of the vehicle at fixed intervals and controls the light emission of the LEDs so as to illuminate the cabin. In this case, the cabin is illuminated in the way depending on a control mode of the LED inside the cabin, too. As a result, the present invention provides a large variety of illumination modes, so that the choices in design or ornament style also increases accordingly.

The housing 210 of the third to sixth embodiments can be modified as desired as long as the lens 211 is made of a light-transmitting material. Namely, other components, except the lens 211, may be made of an opaque material. Moreover, the housing 210 may have a cross-section including an opening formed at a second width end (inner peripheral end), for example. Then, the lens 211 may be fitted on such opening. In this case, the opening at the first width end (outer peripheral end) of the housing 210 may be eliminated. Then, the flexible PCB 221 and LED lamps 223 can be fitted through the opening formed at the second width end.

The lens 211 is preferably formed substantially over the full length of the inner periphery of the housing 210, in view of illumination efficiency and so on. However, the lens 211 may be formed at least at a predetermined portion of the inner periphery of the housing 210 that is opposed to the light emission side of each LED lamp 223. In addition, the lens surface 212 is preferably made along the entire inside surface of the lens 211, in view of the lighting efficiency. However, the lens surface 212 may be provided only at a fixed portion of the lens 211 so as to face the LED lamp 223.

The lens 211 can be modified as desired as long as it can converge at least a lower half part of the diffused light of the LED lamp 223, which travels with a downward inclination relative to the roof 102, so as to transform it into substantially parallel rays to the roof 102, thereby radiating the light toward the cabin. In this case, the lens 211 is disposed in opposite to the light emission side of the LED lamps 223 so as to perform a predetermined lens effect. Namely, the above mentioned lower half part of the diffused light of the LED lamp 223 that passes the lens 211 is vertically converged. Then, the light is transduced into the parallel rays and radiated to the cabin space. Moreover, the light emitted from the lens 211 is composed of nearly parallel rays in relation to the roof 102, so that the light is never diffused downward from the roof 102.

The lens 211 may be configured such that it converges the diffused light of the LED lamp 223 at least in the vertical direction into parallel rays. If the lens 211 is structured such that it converges the diffused light of the LED lamp 223 only in the vertical direction as in the third to sixth embodiments, the light of the LED lamp 223 is diffused in a horizontal direction. Therefore, it is possible to indirectly illuminate a wide area with a small number of LED lamps 223. Moreover, if the diffused light is converged at least in the vertical direction in to parallel rays, there is no harm that the light will obstruct the view of the driver. Then, such room lamp has the above-mentioned advantages, too.

On the other hand, it is possible to provide a lens that converges the diffused light of the LED lamp 223 into parallel rays, not only in the vertical direction but also in the horizontal direction. In this case, the light emitted from the lens is composed of the parallel rays in the vertical direction as well as horizontal direction, i.e. a band of light having generally a rectangular cross section is emitted. With such lens, the light projected out from the indirect lighting unit 200 spreads not uniformly in the horizontal plane over the whole roof 102 but spreads like a band also in the horizontal plane over a specific area of the roof 102. Thus, a unique ornamental effect can be obtained. Such lens is configured by disposing many small pyramid bodies on the inside surface of the lens in a matrix manner. With such lens, a saw-like cross-section extends vertically as well as horizontally. Thus, the diffused light is converged vertically as well as horizontally so that the vertically and horizontally parallel rays are transmitted from the lens.

In order to give the lens the above-mentioned lens function, a structure may be adopted as desired other than the lens having the saw-like cross-section, as long as it can radiate parallel rays. For example, as described as a modification in the first embodiment, a portion of the lens facing the LED lamp 223 is composed of a converging lens. The converging lens converges the light of the LED lamp 223 and radiates the converged light to the roof 102. Then, a specific part of the roof 102 is illuminated so as to provide a unique illumination effect. At this time, if the light colors of the respective LED lamps 223 are changed, the lens radiate different colors of light corresponding to the plural LED lamps 223. Thus, the illumination effect is improved. Moreover, a color filter or the like may be laid and fitted on the outer surface of the lens 211.

The housing 210 can be attached linearly along at least one of the front edge, rear edge, right edge and left edge of the roof 102. For example, the third embodiment of indirect lighting unit 200 may eliminate the right and left elongated parts. Then, it can radiate the parallel rays only from the rear edge of the roof 102 to the front side, thereby uniformly lighting up the roof 102 as a whole. Similarly, the fourth embodiment of indirect lighting unit 200 may eliminate the right and left elongate parts. Then, it can radiate the parallel rays only from the front edge of the roof 102 to the rear side, thereby uniformly lighting up the roof 102 as a whole. Otherwise, only the right and left elongate parts of the indirect lighting unit 200 may be provided on the right and left sides of the roof 102. Then, the parallel rays are radiated only from the right and left edges of the roof 102 to the left and right sides, thereby evenly illuminating the entire roof 102. In this case, the overall roof 102 is uniformly lit up by the color of the light emitted from the indirect lighting unit 200.

A pair of similar linear indirect lighting units 200 may be diametrically disposed at the front and rear edges of the roof 102 so that the parallel rays are transmitted from both the front and rear edges of the roof 102 to the rear and front sides. Then, the whole roof 102 is uniformly illuminated. Otherwise, a pair of similar linear indirect lighting units 200 may be disposed oppositely at the right and left edges of the roof 102 so that the parallel rays are sent out from both the right and left edges of the roof 102 to the left and right aides. Then, the whole roof 102 is uniformly illuminated, too.

An indirect lighting unit 200 may be provided so as to extend along the whole circumference of the roof 102, that is the front edge, rear edge, right edge and left edge. In either case, the entire cabin can be illuminated uniformly. Moreover, the indirect lighting unit in each edge may be provided along the entire length of such edge. Otherwise, it may be provided along portion of the edge.

The first embodiment of indirect lighting unit 20 may substitute the third embodiment of lens 211 for the lens 23. The second embodiment of room lamp may substitute the third embodiment of lens 211 for the light guide 140. Namely, the invention can use the structures of the above embodiments in combination as desired.

While the first and second embodiments use the LED chips 52, 132, 142 as the LED and the third to sixth embodiments use the LED lamps 223 as the LED, either the LED chip or LED lamp can be used in the invention.

In the first, third to sixth embodiments, the flexible PCB 51, 221 is used as a substrate for mounting the LED. Generally, the flexible PCB has flexibility and softness and can be easily bent or curved in a desired shape. Therefore, if the indirect lighting unit 20, 200 is made into a shape having a corner such as a rectangular ring (first embodiment) or U-shape (second embodiment), the flexible PCB 51, 221 can be easily curved or bent in accordance with the corner or follow the corner. When, the LEDs 52, 223 can be easily disposed and mounted on the curved portion or corner of the flexible PCB 51, 221. As a result, the LEDs 52, 223 can be located at the corner of the indirect lighting unit 20, 200 so as to easily provide illumination from the corner.

Generally, it is necessary to provide a lining material on the rear surface of the flexible PCB 51, 221 to mount the LEDs 52, 223 on the flexible PCB 51, 221. Therefore, the flexibility or softness of the flexible PCB 51, 221 may be lowered due to the lining material. Therefore, it is preferable to form one or more elite particularly at the curved portion or corner of the flexible PCB 51, 221 to heighten the flexibility thereof. With such elite, the flexible PCB 51, 221 can be easily curved or bent along the corner so as to follow the comer shape.

Normally, it is difficult for the flexible PCB to be longer than a predetermined length for a specific width. Namely, the length of the flexible PCB has a limit for the width. Therefore, it is preferable to set the width of the flexible PCB 51, 221 double the usual size and fold it at its lateral centerline. With such structure, the flexible PCB can be twice as long as the usual case. Then, the long flexible PCB is disposed along the edge of the roof 102. Thus, if a very long flexible PCB is necessary, a flexible PCB having a necessary length is obtainable.

The inventive indirect lighting unit 20 may be disposed in other ways than the above-mentioned one. It may be disposed at any place as long as it is the outer circumference side of the direct lighting unit 10. For example, the indirect lighting unit 20 may be located at the outer circumference side of the direct lighting unit 10 so that it is exposed as a whole from the outer circumference of the direct lighting unit 10. To the contrary, the indirect lighting unit 20 may be disposed at the inside of the direct lighting unit 10 so that it is entirely covered by the direct lighting unit 10 or wholly housed in the inside (upper side) thereof.

Moreover, the inventive indirect lighting unit 20 may be controlled to emit light in modes other than the above-mentioned one. For example, while the color change is carried out manually by the on-off switch 43 and mode switch 44 in the first embodiment, the color may be changed automatically in accordance with various conditions such as the brightness in the cabin and so on. The above-structured room lamp is preferably disposed at the center of the roof of a car having a large cabin, particularly a one box car or recreational vehicle. However, the present invention is not limited to large cabin vehicles. It may be installed in any size vehicle.

The preferred embodiments described herein are illustrative and not restrictive, the scope of the invention being indicated in the appended claims and all variations which come within the meaning of the claims are intended to be embraced therein.

What is claimed is:

1. A vehicle room lamp comprising:
   a direct lighting unit, attached to a roof of a cabin, for directly illuminating the cabin, the direct lighting unit having a housing of a box shape, the housing having an outer circumference of substantially a round shape, the housing having a fixing piece formed around the outer circumference so as to protrude from the outer circumference, the fixing piece having a cross-section of a hook extending upward; and
   an indirect lighting unit indirectly illuminating the cabin, the indirect lighting unit having a housing of a toroidal box shape corresponding to substantially the entire outer circumference (outline) of the housing of the direct lighting unit, the indirect lighting unit having a plurality of light emitting diodes (LEDs) disposed at fixed intervals along an entire outer circumference of the housing of the indirect lighting unit and controlling the light emission of the LEDs such that the LEDs illuminate the roof, the housing of the indirect lighting unit having a fitting recess extending along a circumference of the housing of the indirect lighting unit, and the fitting recess being provided at a portion corresponding to the fixing piece;
   wherein, in mounting the direct lighting unit on the roof, the fixing piece is fitted into the fitting recess to provide downward support for the housing of the indirect lighting unit so that the housing of the indirect lighting unit is immovably held between the fixing piece and the roof, and the direct lighting unit is secured to the roof so that the indirect lighting unit is also secured to the roof integrally and simultaneously with the direct lighting unit, while the housing of the indirect lighting unit is simultaneously attached onto the outer circumference of the housing of the direct lighting unit; and
   wherein the indirect lighting unit directly illuminates a whole area of a roof except an area where the direct lighting unit and the indirect lighting unit are disposed, thereby providing an indirect illumination for the cabin with the light reflected by the roof.

2. A vehicle room lamp according to claim 1 further comprising:
   a lens located within the housing of the indirect lighting unit and disposed near the outer circumference of the housing of the direct lighting unit so that the light of the LED is radiated to the roof via the lens.

3. A vehicle room lamp according to claim 1, wherein each of the LEDs emits a plurality of colors of light and the indirect lighting unit controls the LEDs to emit different colors of light when a door of a vehicle, containing the vehicle room lamp, is opened and closed.

4. A vehicle room lamp according to claim 2, wherein the lens is a converging lens that vertically converges at a lower portion of a diffused light of the LED that travels to the roof with a downward inclination, in order to transform the lower portion of the diffused light into a light composed of rays substantially parallel to the roof, such that the parallel rays are radiated to the cabin.

5. A vehicle room lamp comprising:
   a room lamp unit, attached to a roof of a cabin, for directly illuminating the cabin, the room lamp unit having a housing of a box shape, the housing having an outer circumference of substantially a round shape, the housing having a fitting piece formed around the outer circumference so as to protrude from the outer circumference, the fitting piece having a cross-section of a hook extending upward; and
   an indirect lighting unit indirectly illuminating the cabin, the indirect lighting unit having a housing of a U-shape in plan view corresponding to an outer circumference of the roof containing both lateral side edges and one of a front edge and a rear edge of the roof, the indirect lighting unit having a plurality of light emitting diodes disposed at fixed intervals along an entire inner circumference of the housing of the indirect lighting unit and controlling the light emission of the LEDs such that the LEDs illuminate the roof, the housing of the indirect lighting unit having a support ring located at a center part of the housing of the indirect lighting unit, the support ring having a ring shape corresponding to substantially the entire outer circumference of the housing of the room lamp unit, the support ring having a fitting recess extending along a circumference of the support ring, and the Fitting recess being provided at a portion corresponding to the fitting piece;
   wherein, in mounting the direct lighting unit on the roof, the fitting piece is fitted into the fitting recess to provide downward support for the support ring of the housing of the indirect lighting unit so that the housing of the indirect lighting unit is immovably held between the fitting piece and the roof, and the room lamp unit is secured to the roof so that the indirect lighting unit is also secured to the roof integrally and simultaneously with the room lamp unit, while the support ring of the housing of the indirect lighting unit is simultaneously attached onto the outer circumference of the housing of the room lamp unit; and
   wherein the indirect lighting unit directly illuminates a whole area of a roof except an area where the room lamp unit and the indirect lighting unit are disposed, thereby providing an indirect illumination for the cabin with the light reflected by the roof.

6. A vehicle cabin lamp system comprising:
a direct lamp unit for directly illuminating the vehicle cabin,
   wherein the direct lamp unit is configured for direct attachment to an interior roof of the vehicle cabin and provide a receiving portion; and
an indirect lighting unit for indirectly illuminating the cabin, the indirect lighting unit having a housing comprising a substantially U-shaped structure configured to provide an attachment portion and to extend around a major portion of a periphery of the interior roof, the periphery of the interior roof comprising two side edges, a front edge, and a rear edge,
   wherein the indirect lighting unit comprises a plurality of light emitting diodes disposed in a predetermined array along an entire inner face to the indirect lighting unit for illuminating substantially all of the interior roof and thereby provide indirect illumination of the vehicle cabin,
   and further wherein the indirect lighting unit is mounted adjacent the interior roof by connecting the attachment portion to the receiving portion of the direct lighting unit.

7. A vehicle room lamp according to claim 5, further comprising a switch for starting a control operation of the indirect lighting unit and wherein each of the LEDs emits a plurality of colors of light and wherein the switch is a color change switch that is activated to change the color of a light of the LEDs.

8. A vehicle room lamp according to claim 5, wherein the switch is a brightness change switch that is activated to change the brightness of a light of the LEDs.

9. A vehicle room lamp according to claim 5, wherein the indirect lighting unit controls the light emission of the LEDs when a door of a vehicle, containing the vehicle room lamp, is opened and closed.

10. A vehicle room lamp according to claim 5, further comprising a lens disposed in the housing so as to face a light emission side of the LED the lens vertically converging at a lower portion of a diffused light of the LED that travels to the roof with a downward inclination, in order to transform the lower portion of the diffused light into a light composed of rays extending parallel to the roof, such that the parallel rays arc radiated to the cabin.

\* \* \* \* \*